(12) United States Patent
Suzuki

(10) Patent No.: US 7,043,605 B2
(45) Date of Patent: May 9, 2006

(54) DISK ARRAY APPARATUS

(75) Inventor: Katsuyoshi Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 100 days.

(21) Appl. No.: 10/821,889

(22) Filed: Apr. 12, 2004

(65) Prior Publication Data

US 2005/0182899 A1 Aug. 18, 2005

(30) Foreign Application Priority Data

Feb. 18, 2004 (JP) ............................. 2004-042138

(51) Int. Cl.
*G06F 12/16* (2006.01)
(52) U.S. Cl. ...................... 711/114; 711/170; 710/43
(58) Field of Classification Search .................... None
See application file for complete search history.

(56) References Cited

U.S. PATENT DOCUMENTS

| | | | |
|---|---|---|---|
| 5,940,629 A | 8/1999 | Rikukawa et al. | |
| 5,956,665 A | 9/1999 | Martinez et al. | |
| 6,384,842 B1 | 5/2002 | DeKoning et al. | |
| 6,675,253 B1 * | 1/2004 | Brinkmann et al. | 710/316 |
| 6,799,283 B1 * | 9/2004 | Tamai et al. | 714/6 |
| 6,823,477 B1 * | 11/2004 | Cheng et al. | 714/26 |
| 6,851,029 B1 * | 2/2005 | Matsunami et al. | 711/154 |
| 6,854,091 B1 * | 2/2005 | Beaudoin | 715/854 |
| 6,877,110 B1 * | 4/2005 | Suzuki et al. | 714/7 |
| 6,915,397 B1 * | 7/2005 | Lubbers et al. | 711/162 |
| 6,920,494 B1 * | 7/2005 | Heitman et al. | 709/223 |
| 6,920,511 B1 * | 7/2005 | Sicola et al. | 710/100 |
| 2002/0082349 A1 | 6/2002 | Takahashi et al. | |
| 2003/0141105 A1 | 7/2003 | Sugaya et al. | |

FOREIGN PATENT DOCUMENTS

| | | |
|---|---|---|
| EP | 0 512 401 A2 | 11/1992 |
| JP | 10-198528 | 1/1997 |

OTHER PUBLICATIONS

US 6,820,175, 11/2004, Fujimoto (withdrawn)

* cited by examiner

*Primary Examiner*—Mano Padmanabhan
*Assistant Examiner*—Gregory Hein
(74) *Attorney, Agent, or Firm*—Reed Smith LLP; Stanley P. Fisher, Esq.; Juan Carlos A. Marquez, Esq.

(57) ABSTRACT

Performance and reliability as a disk array system can be always kept optimal even when a group construction of disk drives is changed. The disk array system is connectable to a host and includes a plurality of drives, input/output control portions for controlling data input/output between the host and the drives, a plurality of paths for connecting the drives and the input/output control portions and modules each accommodating a predetermined number of drives. When the number of the drives is increased or decreased, other drives or modules connected to paths different from the paths connected to the drives to be increased or decreased are displayed. When the number of the drives is increased or decreased, other drives accommodated in modules different from the modules accommodating the drives to be increased or decreased are displayed.

15 Claims, 18 Drawing Sheets

FIG.5

DISK ARRAY APPARATUS

CROSS-REFERENCE TO RELATED APPLICATION

The present application relates to and claims priority from Japanese Patent Application No. 2004-042138 filed on Feb. 18, 2004, the entire contents of which is incorporated herein by reference.

BACKGROUND OF THE INVENTION

This invention relates to a disk array system. More particularly, the invention relates to a technology suitable for a disk array system which is used as a large capacity data storage apparatus and for which high reliability and high response to an input/output request are required.

An array system called "RAID (Redundant Array of Inexpensive Disks)" that is constituted by preparing a large number of hard disk drives as storage devices and causing them to distributedly store data has been put in the past into practical application.

This array system uses dozens to hundreds of storage devices (hard disk drives) and selects a plurality of storage devices among them (four drives in the case of 3D+1P in RAID number 5, for example) and a group of these storage devices constitute an RAID group. It will be assumed that eight SCSI (Small Computer System Interface) interfaces are connected to one channel control portion. It will be further assumed that a set of storage devices are connected to one interface, another set of storage devices are connected to another interface, and, similarly, other six sets of storage devices are connected to the remaining six interfaces, respectively. In the case of interface of the SCSI system, the maximum number of devices (storage devices) that can be connected to one interface is 16. Therefore, because eight interfaces are disposed in the example given above, maximum 8×16=128 storage devices can be connected.

The storage devices connected in this way are grouped into RAID groups each containing a predetermined number of storage devices. A parity bit is generated for a data block inputted to the apparatus and the data in the data block is divided and stored in the storage devices in the group. The parity is stored in another storage device in the group, too. Eight storage devices each connected to separate SCSI interfaces constitute one group. Seven storage devices in the group divide and store the data and the remaining one storage device stores the parity. For example, in a "RAID number 5" case, such a storage construction is called a "group of 7D+1P construction" (so-called "RAID group"). The number of the storage devices constituting the group varies depending on an application that is used, a data quantity handled, an object of use, and so forth.

SUMMARY OF THE INVENTION

In the disk array system of this kind, an RAID group construction of the storage devices is appropriately changed relatively frequently in accordance with the use condition of the disk array system. For example, the number of RAID groups is sometimes increased or decreased or the number of storage devices in one RAID group is sometimes increased or decreased.

When the RAID groups of the disk array system are set, it is preferred to employ the RAID group construction capable of executing high speed data access. When a storage device is added to a RAID group, optimum selection for the data access cannot be made in many cases if a storage device arranged at a position closest to the storage device of the RAID group is merely selected from among the storage devices that are empty at present. For example, paths of a plurality of systems are prepared in some cases as paths to which the hard disk drives inside the disk array system are connected. But, when hard disk drives are merely selected one by one, there is a possibility that a large number of hard disk drives connected to the same path are selected and an excessive load is applied to a specific path when data access is made. To change such a storage device construction, no conventional technology allows the disk array system side to automatically achieve the optimal group construction capable of high speed data access.

When one storage device is removed as an empty storage device from among the storage devices constituting a group, too, the conventional technology does not at all select the storage device while taking re-grouping of the removed storage devices into account.

In view of the background described above, the invention aims at keeping performance and reliability of a disk array system always optimal even when a group construction is changed.

The invention provides a disk array system capable of being connected to a host, comprising a plurality of hard disk drives; an input/output control portion for controlling data input/output between the host and the hard disk drives; a plurality of paths for connecting the hard disk drives and the input/output control portion; and modules each accommodating a predetermined number of the hard disk drives; wherein, when the number of the hard disk drives is increased or decreased, the disk array system has a function of displaying other hard disk drives or modules connected to paths different from paths connected to the hard disk drives to be increased or decreased.

The invention provides a disk array system capable of being connected to a host, comprising a plurality of hard disk drives; an input/output control portion for controlling data input/output between the host and the hard disk drives; a plurality of paths for connecting the hard disk drives and the input/output control portion; and modules each accommodating a predetermined number of the hard disk drives; wherein, when the number of the hard disk drives is increased or decreased, the disk array system has a function of displaying other hard disk drives accommodated in modules different from the modules accommodating the hard disk drives to be increased or decreased.

The invention can be accomplished by a method that converts the invention into software and installing the software to a computer for managing a disk array system, for example. In other words, when the number of hard disk drives is increased or decreased as a managing method of a disk array system including a plurality of hard disk drives, an input/output control portion for controlling data input/output between the host and the hard disk drives, a plurality of paths for connecting the hard disk drives and the input/output control portion, and modules each accommodating a predetermined number of the hard disk drives, other hard disk drives or modules connected to paths different from the paths connected to the hard disk drive or drives to be increased or decreased may be displayed.

As a management method of a disk array system including a plurality of hard disk drives, an input/output control portion for controlling data input/output between the host and the hard disk drives, a plurality of paths for connecting the hard disk drives and the input/output control portion, and modules each accommodating a predetermined number of the hard disk drives, the invention may display other hard disk drives accommodated in modules different from the modules accommodating the hard disk drives to be increased or decreased when the number of the hard disk drives is increased or decreased.

According to the invention, when the number of the hard disk drives is increased or decreased, the disk array system has the function of displaying other hard disk drives or modules connected to paths different from the paths connected to the hard disk drives to be increased or decreased. Therefore, when the RAID group construction is changed, for example, the hard disk drives connected to the different paths can be selected on the basis of display and can be increased or decreased while selecting uniformly the paths prepared. Consequently, the operation of the disk array system can be kept always appropriate.

To increase the groups constituted by a predetermined number of hard disk drives in this case, other hard disk drives connected to the paths different from the paths connected to the selected hard disk drives are displayed among the hard disk drives not used. Therefore, when an RAID group is generated afresh, the hard disk drives are selected on the basis of this display, the kinds of the paths can be distributed in the group and grouping capable of high speed access can be made.

In this case, when a plurality of hard disk drives constituting the group are a plurality of hard disk drives distributedly connected to a plurality of paths, the kinds of the paths in the groups automatically generated become distributed.

As to the modules each accommodating a plurality of hard disk drives constituting a group, too, the group is distributed into a plurality of modules. Therefore, a group capable of coping with a trouble occurring in a specific module can be generated.

When the number of the hard disk drives is decreased in a group constituted by a predetermined number of hard disk drive, other hard disk drives connected to paths different from the paths connected to the selected hard disk drives are distributed. Consequently, the kinds of paths of the hard disk drives not used get distributed and when the RAID group is re-constituted by using the hard disk drives not used, the kinds of the paths get distributed in the group and suitable grouping capable of high speed access can be made.

In this case, when a plurality of hard disk drives not used are distributed to hard disk drives connected to a plurality of paths, the kinds of paths of the hard disk drives not used can be automatically distributed.

When the number of hard disk drives is increased or decreased, the invention has a function of displaying other hard disk drives accommodated in modules different from the module accommodating the hard disk drives to be increased or decreased. Therefore, when the RAID group construction is changed, for example, the hard disk drives accommodated in the different modules can be selected on the basis of display and the hard disk drives can be increased or decreased while selecting uniformly a plurality of modules prepared. The operation of the disk array system can thus be kept always appropriate.

In this case, when the number of groups each constituted by a predetermined number of hard disk drives is increased, the invention displays other hard disk drives accommodated in modules different from the modules accommodating the selected hard disk drives among the hard disk drives not used, the hard disk drives can be selected on the basis of this display to generate afresh an RAID group and the modules used in the groups can be distributed. Accordingly, grouping capable of coping with any trouble occurring in a specific module can be made appropriately.

In this case, when the hard disk drives constituting each group are distributed and accommodated in a plurality of modules, the modules can be distributed in the group generated automatically.

When the number of hard disk drives in groups each constituted by a predetermined number of hard disk drives is decreased, the invention displays other hard disk drives accommodated in modules different from a module accommodating a selected hard disk drives. Therefore, the modules accommodating the hard disk drives not used are distributed and when an RAID group is re-constituted by using the hard disk drives not used, the modules used in the group can be distributed and grouping can be made appropriately.

In this case, when a plurality of hard disk drives not used are distributed to hard disk drives accommodated in a plurality of modules, the kinds of the modules accommodating the hard disk drives not used can be automatically distributed.

According to the invention, when the number of the hard disk drives is increased, the invention displays a view for designating an RAID level after the change and the number of hard disk drives forming the RAID level after the change, and displays also the hard disk drives as the object of the increase so that the number of usable hard disk drives or distribution of paths connected to the hard disk drives to be used attains maximum.

According to the invention, when the number of the hard disk drives is decreased, the invention displays a view for designating an RAID level after the change and the number of hard disk drives forming the RAID level after the change, and displays also the hard disk drives connected to a path having the smallest number of connections among a plurality of paths connected to the hard disk drives not used as the object of the decrease. Therefore, the hard disk drives as the object of decrease can be selected appropriately.

According to the invention, when the number of the hard disk drives is decreased, the invention displays a view for designating an RAID level after the change, and the number of hard disk drives forming the RAID level after the change, and displays also the hard disk drives as the object of decrease so that the kinds of paths connected to the hard disk drives forming the RAID group becomes maximal. Therefore, the hard disk drives as the object of decrease can be selected appropriately.

Other objects, features and advantages of the invention will become apparent from the following description of the embodiments of the invention taken in conjunction with the accompanying drawings.

BRIEF DESCRIPTION OF THE DRAWINGS

FIG. 5 is an explanatory view showing a display example according to an embodiment of the invention;

DESCRIPTION OF THE EMBODIMENTS

An embodiment of the invention will be hereinafter explained with reference to FIGS. 1 to 21.

Figure 1:
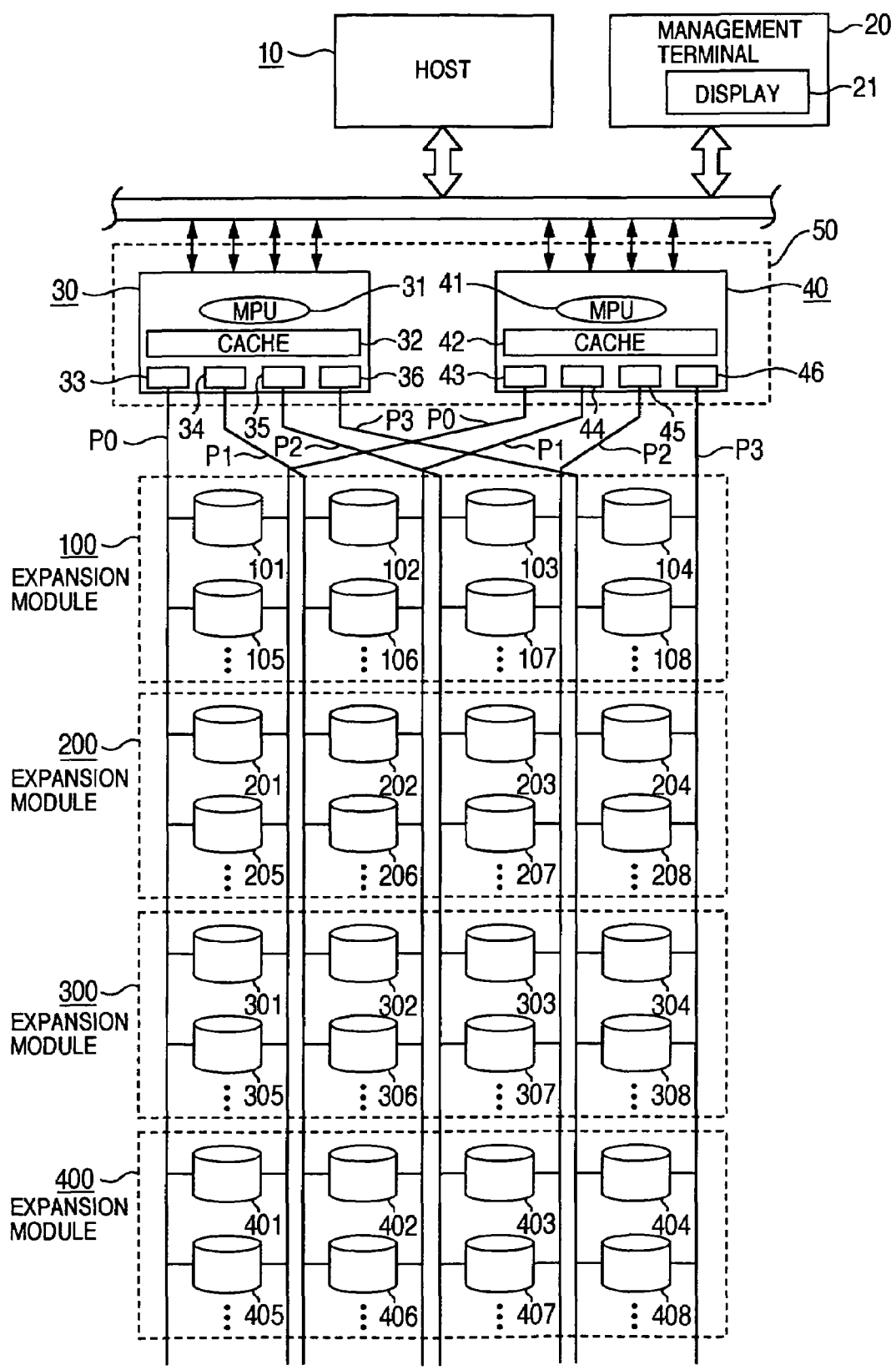
FIG. 1 is a structural view showing a structural example of an array system according to an embodiment of the invention.

FIG. 1 shows an overall construction of a disk array system according to the embodiment. In the disk array system according to this embodiment, a large number of hard disk drives 101 to 116 and 201 to 216 are prepared as storage devices and data is distributedly stored in a hard disk as a storage medium inside each hard disk drive. Incidentally, the hard disk drive will be handled as a storage device in the description that follows.

The disk array system according to the embodiment has a host computer 10 functioning as an input/output control unit for controlling data input/output access to and from outside and allocation of data to each disk drive. The host computer 10 has a construction capable of data transfer data to a management terminal device 20 and drive controllers 30 and 40 through a bus line.

The management terminal device 20 is a terminal that functions as a management unit for managing setting of the disk array system, etc and is constituted by a notebook type personal computer, for example. A liquid crystal display fitted to the personal computer is used as a display 21 for displaying various management data. An operator can execute setting and maintenance and management of the disk array system by operating a keyboard of the computer constituting the management terminal device 20 while confirming the setting state displayed on the display 21. When group setting of the hard disk drives to be later described is made, too, the operator can change setting in accordance with an instruction on the display while displaying setting of groups. A concrete processing example of the change of setting will be described later.

Drive controllers 30 and 40 have basically the same construction and are accommodated in a controller module (or rackmount controller module or rackmount processor chassis) 50. Each of the drive controllers 30 and 40 is individually connected to each hard disk drive and functions as an input unit for supplying data to the hard disk drive and to let it store the data and as an output unit for reading out the stored data. The drive controller 30 includes a microprocessor 31, a cache memory 32 and adaptors 33, 34, 35 and 36. While causing the cache memory 32 to temporarily store the data under control of the microprocessor 31 on the basis of the instruction from the host computer 10, the drive controller 30 can execute data input to the hard disk drive connected through the adaptors 33 to 36 and data output from the hard disk drive.

When the data inputted from outside is stored in the hard disk drive in this case inside the drive controller 30, the data block inputted is divided into the number corresponding to the group construction of the hard disk drives to be later described, a parity is generated from the data block, and the divided data and the parity are stored in the discrete hard disk drives. The adaptors 33, 34, 35 and 36 for establishing connection with the hard disk drives are adaptors for establishing connection through a loop (FC-AL: Fibre Channel Arbitration Loop) constituted by Fibre Channel (FC) and capable of serial data transfer at a high speed and are individually prepared for later-appearing four paths P0, P1, P2 and P3.

The drive controller 40, too, includes a microprocessor 41, a cache memory 42 and adaptors 43, 44, 45 and 46 and executes processing in the same way as the drive controller 30 described above.

A predetermined number of sets of hard disk drives are accommodated in each expansion module (or rackmount expansion module or rackmount disk expansion chassis) 100, 200, 300 and 400. In this embodiment, sixteen hard disk drives 101 to 116 are accommodated in the expansion module 100, sixteen hard disk drives 201 to 216 are accommodated in the expansion module 200, sixteen hard disk drives 301 to 316 are accommodated in the expansion module 300 and sixteen hard disk drives 401 to 416 are accommodated in the expansion module 400, for example. The hard disk drives in each expansion module 100, 200, 300 and 400 can be discretely exchanged. The hard disk drives of each expansion module can be collectively fitted to and removed from the disk array system in the unit of the expansion module. A power source circuit is disposed in the unit of the expansion module, too, to supply power to the hard disk drives.

The hard disk drives accommodated in each expansion module 100, 200, 300 and 400 are respectively connected to the drive controllers 30 and 40 and can input the data to be stored in the hard disk drives and can output the stored data from the hard disk drives under control of these drive controllers 30 and 40.

Each hard disk drive has at least two ports as data input/output ports. One of the ports is connected to one of the drive controllers 30 and the other, to the other drive controller 40 or in other words, in dual connection. Connection between each hard disk drive and the drive controllers 30 and 40 is hereby made through a loop (FC-AL) constituted by Fibre Channel (FC). The detail of the connection structure by the Fibre Channel will be described later but the connection structure hereby has four systems of back-end paths P0, P1, P2 and P3. The hard disk drives are divided into four groups of the groups connected respectively to the path P0, the path P1, the path P2 and the path P3. In this embodiment, the hard disk drives inside the respective expansion modules 100 to 400 are divided substantially uniformly into four groups. Each path has a loop connection.

Figure 2:
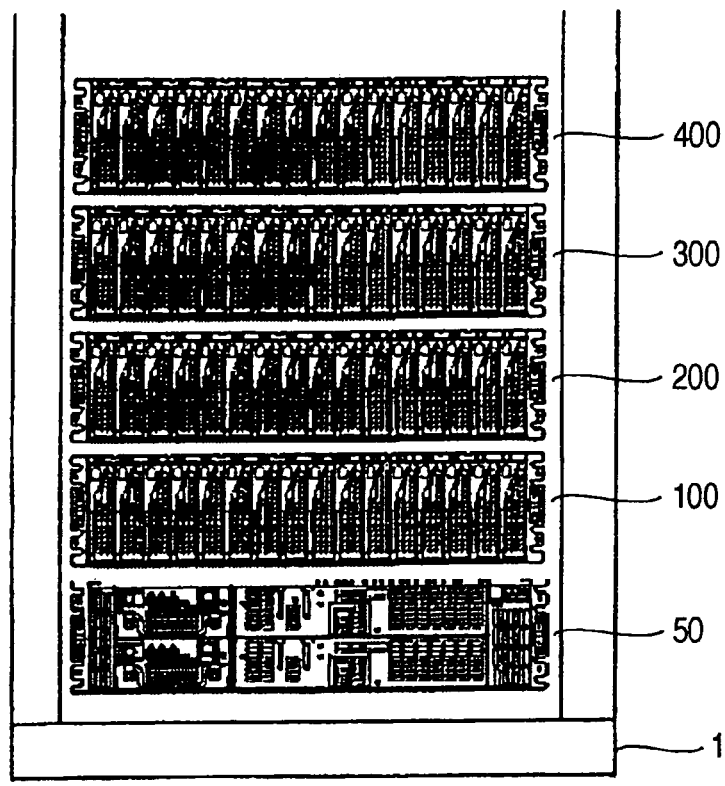
FIG. 2 is a structural view showing an arrangement example of an array system according to an embodiment of the invention.

FIG. 2 shows an arrangement example of each part inside the disk array system. A unit accommodating the host computer 10 and the drive controllers 30 and 40 is arranged at a lower part of the module constituting the disk array system 1 and a necessary number of expansion modules 100, 200, 300 and 400 each accommodating a plurality of hard disk drives are stacked on the unit. The management terminal device 20 is constituted by the host computer 10, the drive controllers 30 and 40 and the personal computer connected through an LAN and is arranged at a position for managing the disk array system 1. Alternatively, the management terminal device 20 may well be constituted by the notebook type personal computer and be arranged at a predetermined position of the disk array system 1.

Figure 3:
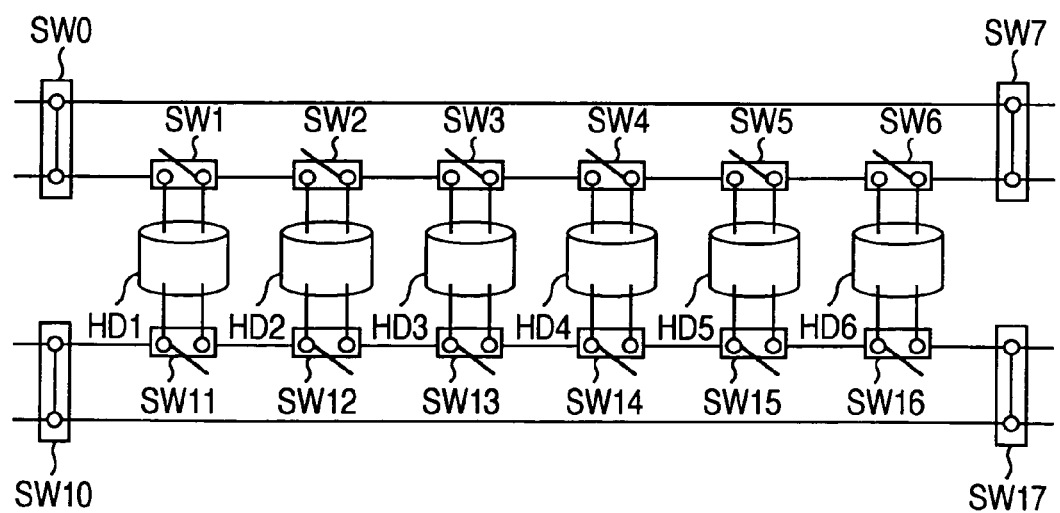
FIG. 3 is a structural view showing a connection example of storage devices according to an embodiment of the invention.

FIG. 3 shows a connection example of the hard disk drives through the Fibre Channel. The drawing shows an example where six hard disk drives HD1 to HD6 are connected to a path of one system of the Fibre Channel. As already explained, each hard disk drive has at least two input/output ports. One of the input/output ports is connected to a loop (loop shown at an upper part of the disk drive in FIG. 3) as the path of the Fibre Channel connected to one of the drive controllers 30 and the other port is connected to a loop (loop at a lower part of the disk drive in FIG. 3) as a path of the Fibre Channel connected to the other drive controller 40.

Each hard disk drive is connected through a port bypass switch. In other words, each switch SW0 to SW17 shown in FIG. 3 is a port bypass switch. Each of the port bypass switches SW1 to SW6 is arranged at one of the ports (port on the upstream side of FIG. 3) of each hard disk drive HD1 to HD6. The port bypass switches SW0 and SW7 are arranged also at one and the other end of the expansion module. The adaptor on the side of the drive controller 30 is connected to the port bypass switch SW0 and terminates at the port bypass switch SW7 at the other end, and the adaptor on the side of the drive controller 30 and six hard disk drives HD1 to HD6 are connected in loop. When any one of the hard disk drives is to be cut off, it can be cut off by switching the switch connected to its port. When another expansion module is connected to the expansion module on the back-end side, the port bypass switch SW7 at the other end is not brought into the termination state and another expansion module is connected at this port bypass switch SW7.

Connection to the adaptor on the side of the drive controller 40 by using the port bypass switches SW11 to SW16 disposed at the other ports (downstream side in FIG. 3) of the hard disk drives HD1 to HD6 and the port bypass switches SW10 and SW17 at one and other ends connected to these port bypass switches SW11 to SW16 are set to the same connection state.

Figure 4:
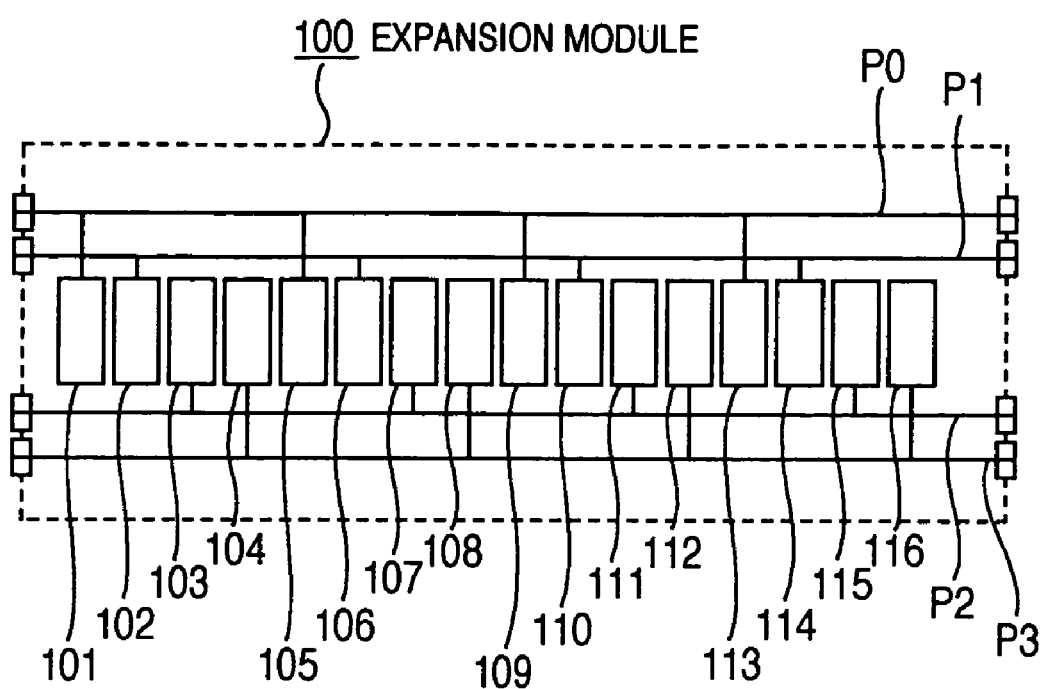
FIG. 4 is a structural view showing a connection example of expansion modules according to an embodiment of the invention.

FIG. 3 shows only the connection state of the paths of one system. In this embodiment, four paths are disposed as already explained and are serially connected to the hard disk drives arranged inside the expansion modules. In the case where sixteen hard disk drives 101 to 106 are serially arranged as shown in FIG. 4, for example, the drives 101, 105, 109 and 113 are connected to the loop of the path P0, the drives 102, 106, 110 and 114 are connected to the loop of the path P1, the drives 103, 107, 111 and 115 are connected to the loop of the path P2 and the drives 103, 108, 112 and 116 are connected to the loop of the path P3. This connection holds also true of the hard disk drives in the other expansion modules 200 and 300. The example shown in FIG. 4 represents the connection state of only one of the ports of each drive and the connection state also holds true of the loop connected to the other port.

When the hard disk drives inside the expansion modules are connected to the disk array system in this way, the connection state is recognized by the host computer 10 and by the management terminal device 20. The management terminal device 20 divides the drives into groups in accordance with the installation condition of the hard disk drives at that time.

Figure 5:
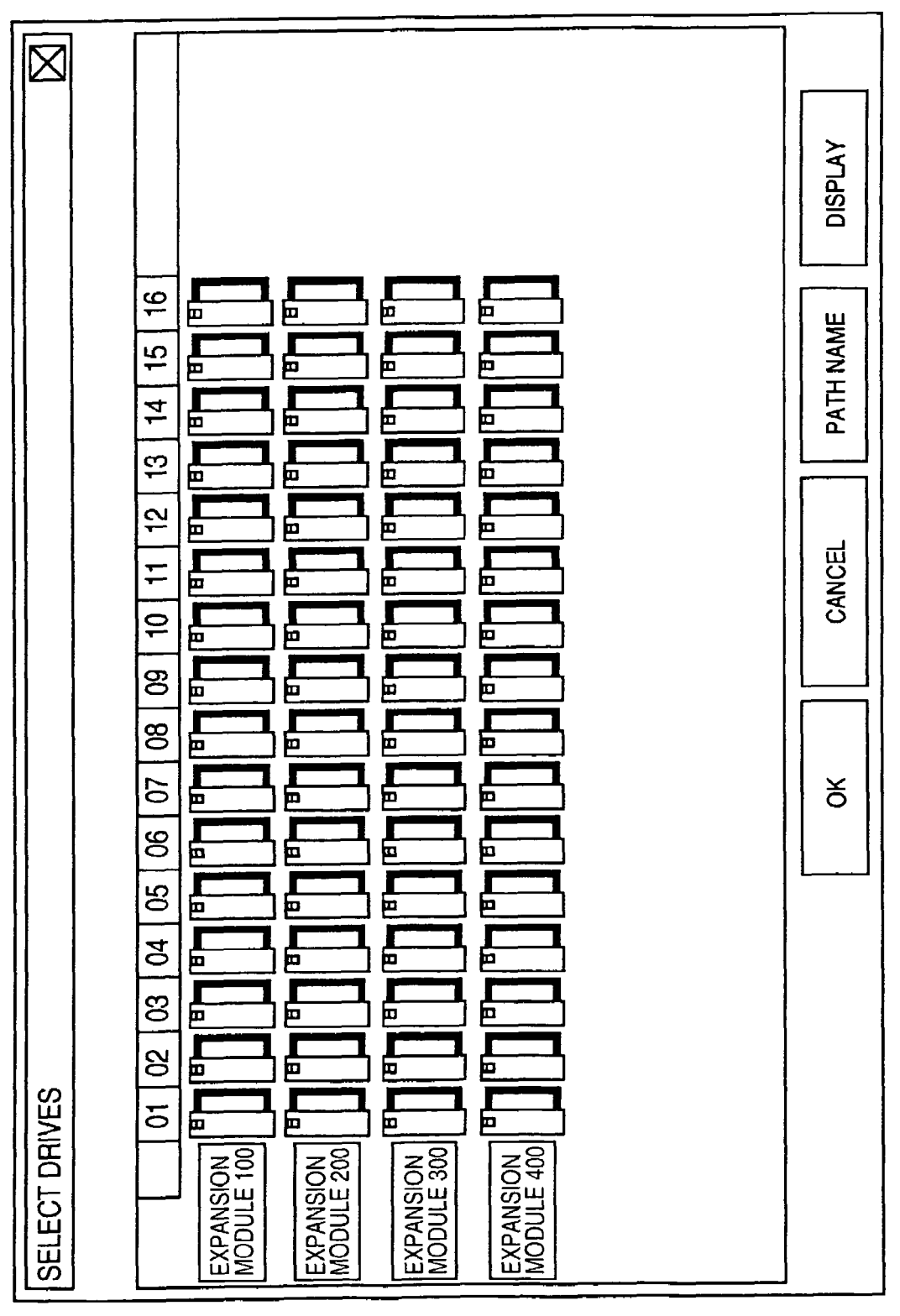

FIG. 5 shows an example where the drive construction is displayed on the display 21 of the management terminal device 20 when a large number of hard disk drives are connected to the disk array system. In this example, four expansion modules each accommodating sixteen disk drives are connected and sixty-four in total of drives constitute the disk array system. The sixty-four drives are displayed in a matrix form on the screen.

When this display is conducted, color classification display is made in accordance with the condition of the drives. For example, the drives that have already been grouped and used and those which have not yet been grouped and used are displayed in different colors. The drives under use are displayed in different colors depending on the paths P0 to P3 connected. The drives that are out of use are also displayed in different colors depending on the paths P0 to P3 connected. Therefore, sixty-four sets of drives are displayed in eight kinds of colors.

Incidentally, all the drives under use may well be displayed in the same color. Alternatively, the drives under use may well be displayed in the colors corresponding to the groups. When grouping is made or empty drives are selected, the drives as candidates are displayed further in different colors as will be described later. To display the candidate drives, display may be so made as to clarify that other drives are not the candidates (by lowering their brightness, for example).

When grouping is made by using the management terminal device 20, the operator selects the drives for forming the group by operating a cursor from among the drives displayed in the matrix form as shown in FIG. 5.

Figure 6:
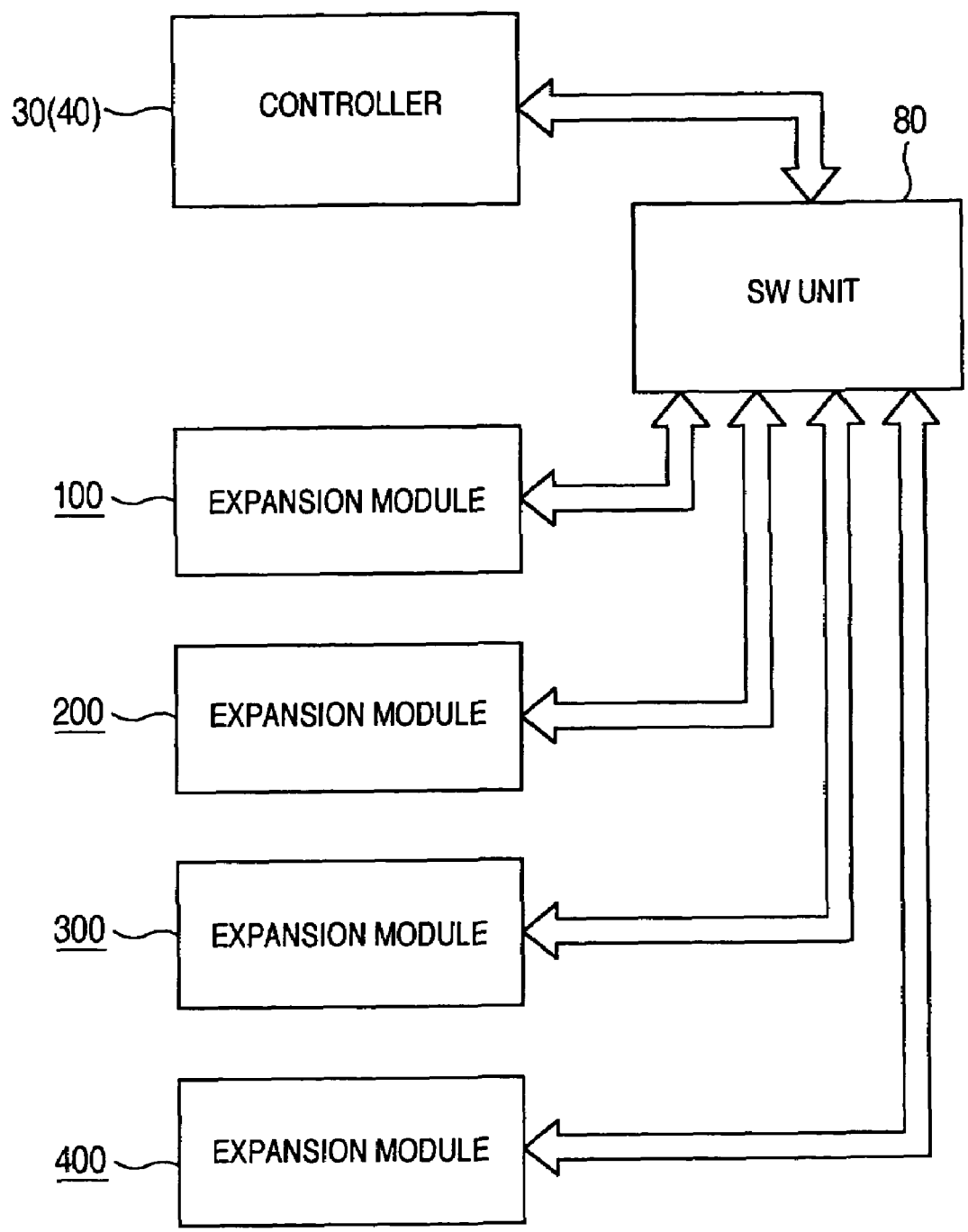
FIG. 6 is a block diagram showing a connection example when a switch unit according to an embodiment of the invention is used.

Incidentally, the hard disk drives in each of the expansion modules 100 to 400 can be connected in series by the changeover operation of the switches SW0 and SW7 in the construction shown in FIG. 3 but the expansion modules may be connected to the drive controller side through a separate switch unit by disposing the separate switch unit from the expansion module. In other words, the drive controller 30 or 40 is connected to the hard disk drives inside each expansion module 100 to 400 through a switch unit 80 as shown in FIG. 6, for example, and when the expansion module is added or removed, such an operation can be achieved by merely operating the switch unit 80. This construction can easily cope with the addition or removal of the expansion modules.

Next, an example of a grouping example of the storage devices (hard disk drives) by use of the management terminal device 20 in the disk array system according to this embodiment will be explained with reference to flowcharts of FIGS. 7 to 10 and to a group structural example shown in FIGS. 11 to 17. The processing that will be explained below is the one that is executed on the basis of the program installed to the computer constituting the management terminal device 20.

Figure 7:
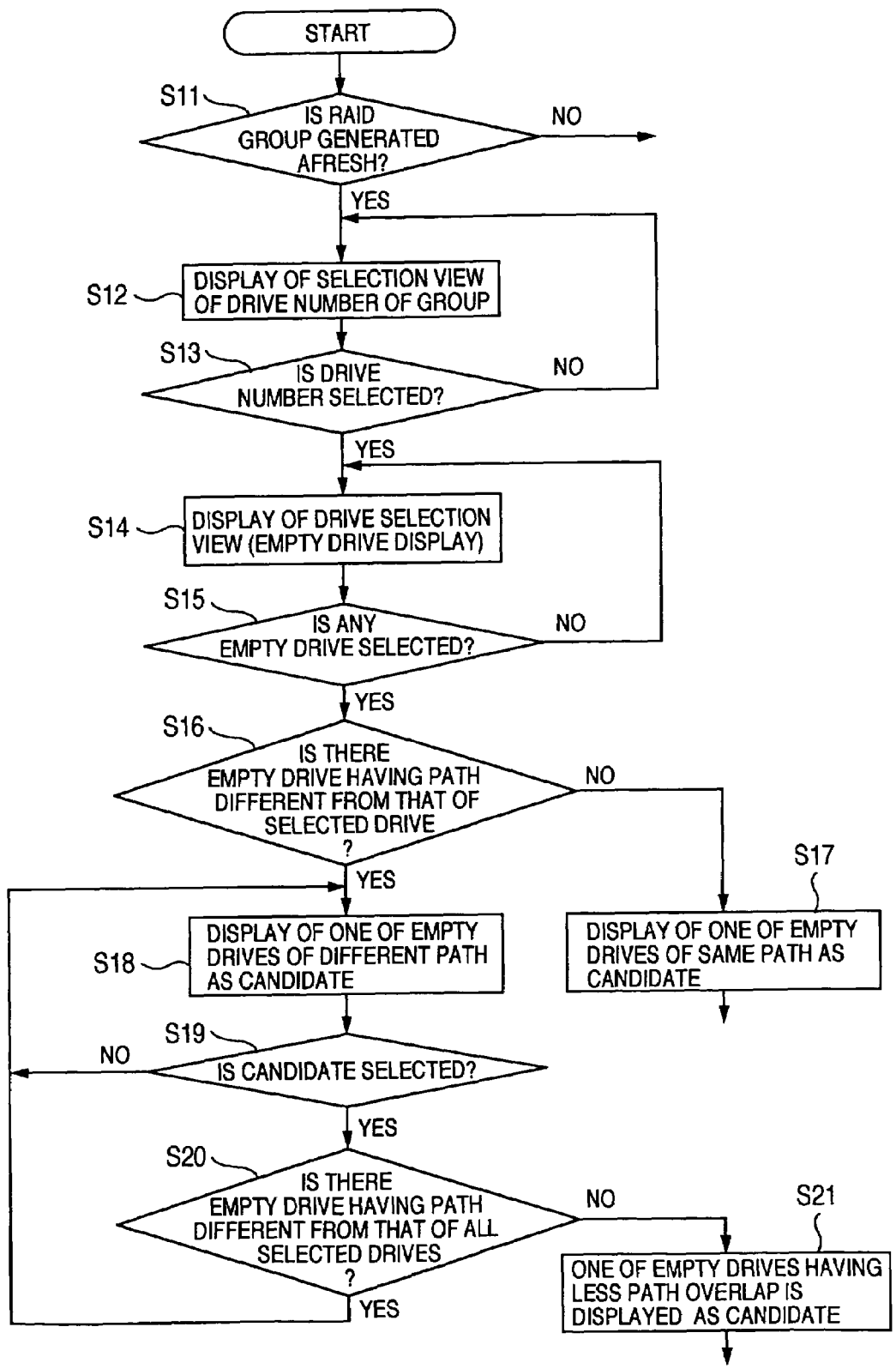
FIG. 7 is a flowchart showing a processing example when a group is afresh generated according to an embodiment of the invention.
Figure 20:
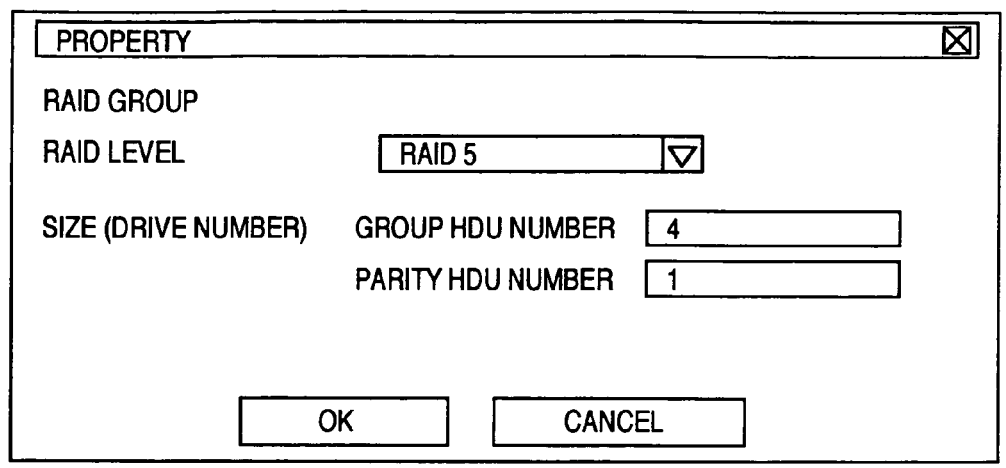
FIG. 20 is an explanatory view showing a display example according to an embodiment of the invention.
Figure 21:
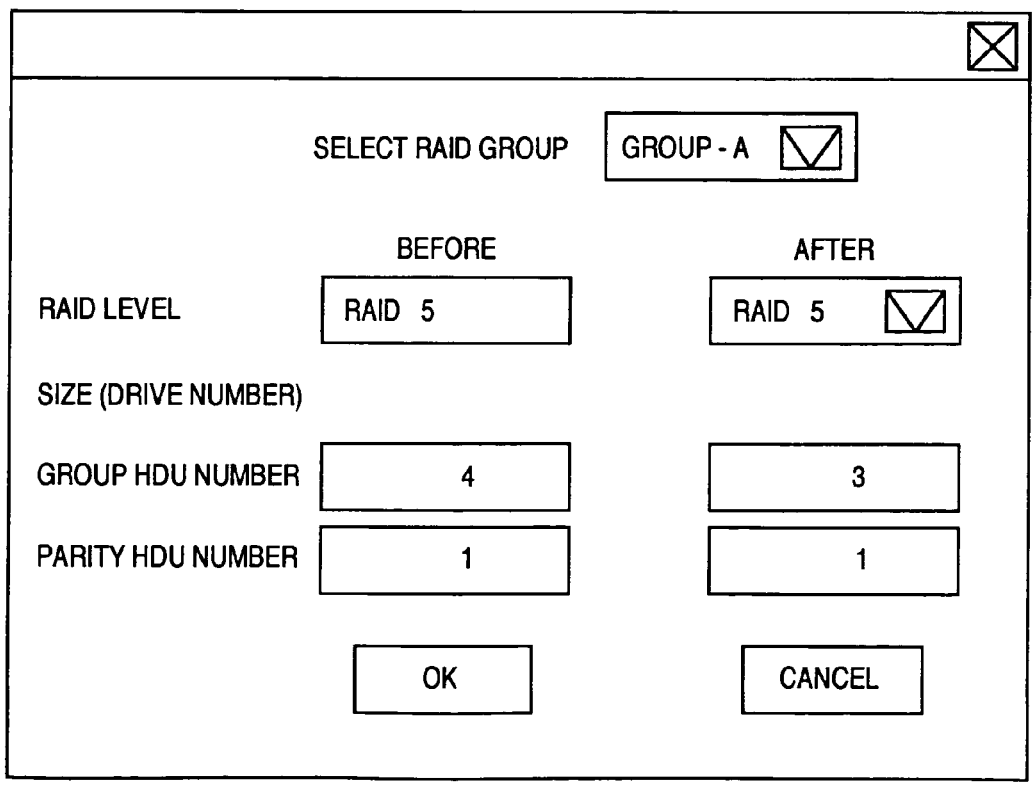
FIG. 21 is an explanatory view showing a display example according to an embodiment of the invention.

Referring initially to FIG. 7, the example of processing for creating afresh a group or groups from among the empty drives will be explained. The control portion inside the management terminal device 20 judges whether or not an operation of generating afresh an RAID group exists (Step S11). When the operation for generating afresh the RAID group is judged hereby as existing, the number of sets of the drives constituting the group is displayed on the screen (Step S12). Next, whether or not selection of the number of the drives is made on the basis of the instruction on the screen is judged (Step S13). FIG. 20 shows a display example of the selection view of the number of drives. To generate the RAID group, the user has to set the RAID level (here, RAID level 5), the number of sets of the drives in one RAID group and the number of sets of the drives used for storing the parity as shown in FIG. 20. Alternatively, as shown in FIG. 21, the RAID group as the change object (expressed by "select RAID group" in the drawing) is selected, and the present RAID level (before the change) of the RAID group, the number of the hard disk drives of the group as the size (number of drives) and the number of drives used for storing the parity are displayed. Each value after the change is inputted in parallel with each value before the change, and an "OK" button is clicked, or a "CANCEL" button is clicked for cancellation.

As described above, selection of the number of drives on the basis of the view on the screen is awaited and when the selection is made, the selection view of the drives shown in FIG. 5 is displayed on the screen and the empty drives among them are displayed by the color, etc, in the form enabling them to be distinguished from the drives under use (Step S14). While this display is made, whether or not any empty drives are selected by the user is judged (Step S15). The display of Step S12 is continued until the selection of the empty drives is made.

When any one of the empty drives is judged as being selected in Step S13, whether or not any empty drives connected to a path of a system different from the system connected to the selected drive exists is judged (Step S16). When the empty drive connected to the path of the different system is not judged as existing, the control portion inside the management terminal device 20 selects one of the empty drives connected to the path of the same system as a candidate drive to be next connected and displays the drive selection view in the display form representing that the selected drive is the candidate (Step S17). After display in Step S17 is executed, selection is made from among the empty drives connected to the path of the same system and the necessary number of drives for forming the group is selected.

When empty drives connected to the path of the different system are judged as existing in Step S16, one of them is selected as the candidate and is displayed on the drive selection view in the display form clarifying that the selected drive is the candidate (Step S18). While this display is made, whether or not the candidate drive is selected is judged (Step S19). When selection of the drive is not made, the processing enters the standby state while display in Step S18 is made. When the drive is selected, whether or not any empty drive connected to a path of a system different from those of all the drives selected so far exists is judged (Step S20).

When the empty drive connected to the path of the system different from those of all the selected drives exists, the flow returns to Step S18 and one of the empty drives connected to the path of the different system is selected as the candidate and is displayed on the drive selection view in the form clarifying that the selected drive is the candidate.

When the judgment result in Step S20 proves that the empty drive connected to the path different from those of all the drive selected so far does not exist, the drives connected to the path of the system having least overlap of the kind of the paths with the selected drives is selected as the candidate and the drive selection view is displayed in the form clarifying that the selected drive is the candidate (Step S21). After display is executed in Step S21, the empty drives having the least overlap of the path kind are serially selected and the drives of the number necessary for forming the group are selected. The drives are selected one by one in this way until the number selected in Step S12 of drives are selected.

When the processing is executed in this way, grouping of the storage devices is made always appropriately even when any change exists in the group construction and performance and reliability of the disk array system can be kept always optimal even when the group construction is changed. Consequently, the operation of the disk array system can be made always appropriately.

In the processing of the flowchart shown in FIG. 7, the drives are selected one by one when the RAID group is generated afresh. However, the RAID group may be automatically generated after the condition (such as the number of sets of the drives constituting the RAID group) is selected.

Figure 8:
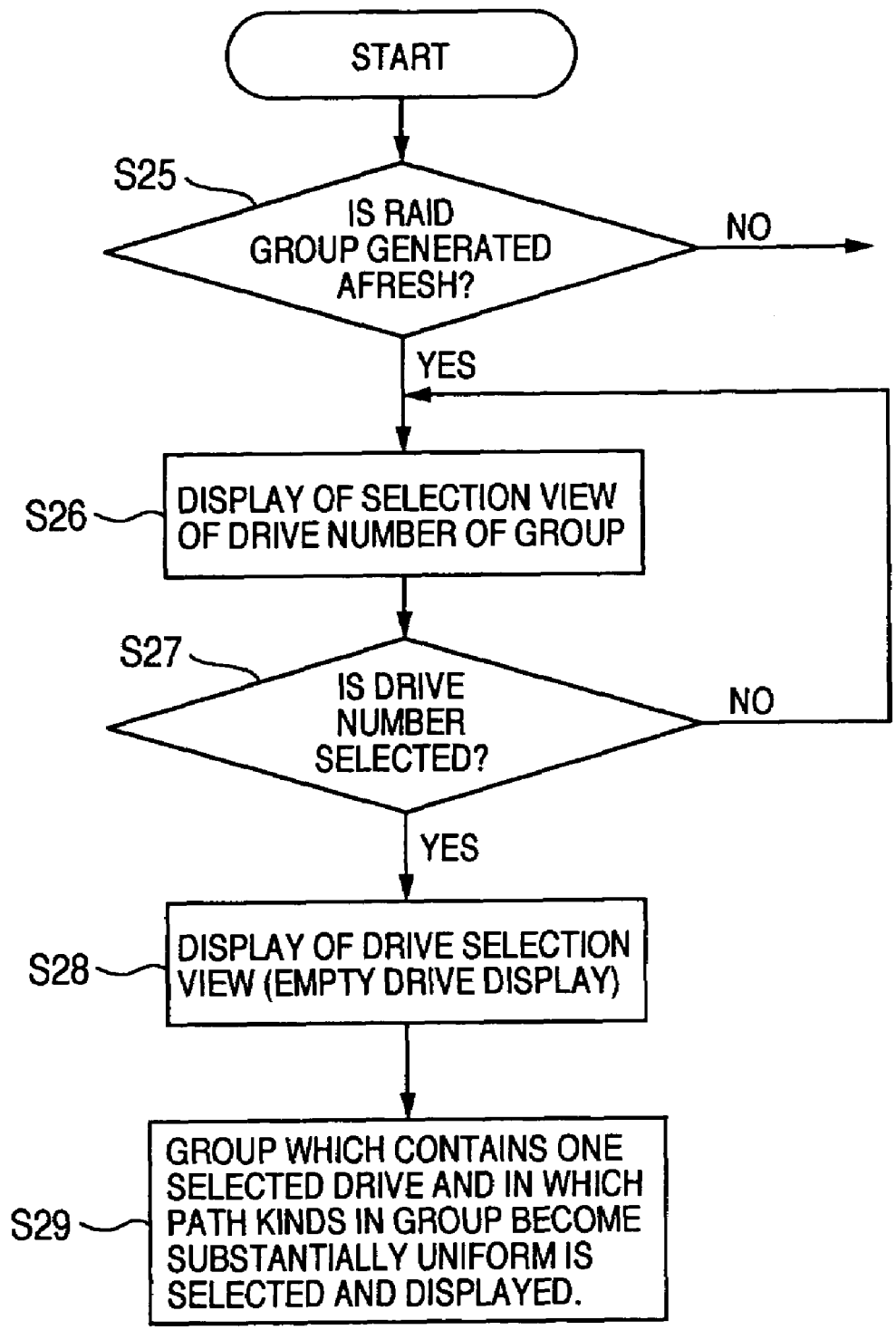
FIG. 8 is a flowchart showing a modified example of processing when a group is afresh generated according to an embodiment of the invention.

FIG. 8 is a flowchart showing an example of this case. Whether or not the operation for generating afresh the RAID group exists is judged in the control portion inside the management terminal device 20 (Step S25). When the operation for generating afresh the RAID group is judged as existing, the view for selecting the number of sets of the drives for constituting the group, shown in FIG. 20, is displayed on the display (Step S26) and whether or not the selection of the drive number exists is judged on the basis of the instruction on the screen (Step S27). Here, the selection of the drive number is awaited and when the selection of the drive number is made, the selection view of the drives shown in FIG. 5 is displayed on the screen in such a fashion that the empty drives among them can be identified by the color, or the like (Step S28).

When any empty drive is selected by the operation of the operator, the designated number of sets of the RAID group is automatically generated and displayed. In the group generated at this time, the drive selected in Step S28 is contained and the necessary number of sets of empty drives is selected to form the group so that the kinds of the paths in the group can be distributed substantially uniformly.

Figure 9:
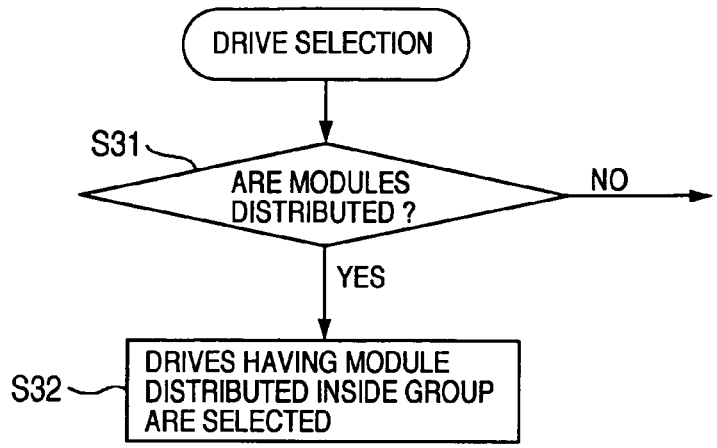
FIG. 9 is a flowchart showing a judgment example when storage devices are selected according to an embodiment of the invention.
Figure 10:
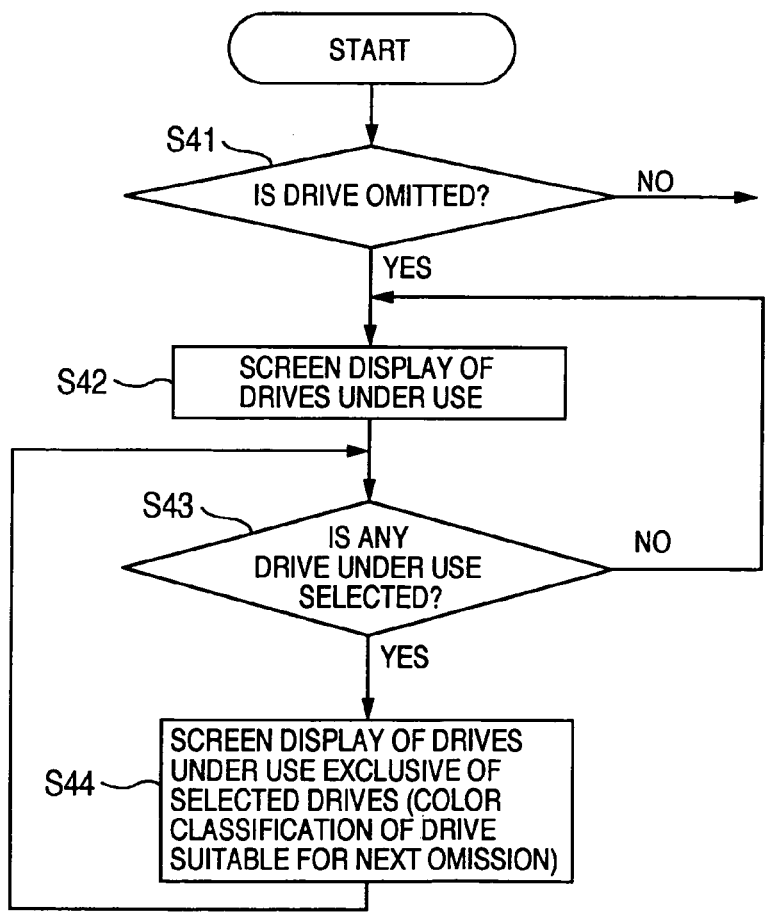
FIG. 10 is a flowchart showing a processing example when storage devices are deleted from a group according to an embodiment of the invention.

The processing shown in the flowcharts of FIGS. 7 and 8 selects the candidate drives from only the aspect of distributing the kinds of the paths at the generation of the new RAID group, but the candidate drives may well be selected in consideration of other factors, too. For example, whether or not distribution of the expansion modules should be taken into account is judged as shown in the flowchart of FIG. 9 (Step S31).

When the distribution of the expansion modules is taken into account, the drives constituting the group are distributed as much as possible into a plurality of expansion modules and the candidate drives are selected in each stage (Step S32). It is naturally possible to execute at this time the processing for distributing the paths shown in the flowcharts of FIGS. 7 and 8. In this way, the drives in one RAID group can be distributedly arranged in a plurality of expansion modules. When the drives in the RAID group constituted by the four drives are distributed into four expansion modules, the storage data can be repaired by use of the parity even when a trouble occurs in the power source circuit of one specific expansion module and all the drives inside the expansion module are stopped. When the drives in one RAID group are distributedly arranged in this way in a plurality of expansion modules, the condition of use of the drives in each expansion module becomes substantially uniform and calorific power per each expansion module can be rendered uniform. Incidentally, to render the calorific value uniform, it is also possible to preferentially distribute and arrange those RAID groups that are used by an application operated at high frequency into a plurality of expansion modules.

It is also possible to accommodate as much as possible the respective groups generated afresh in one expansion module, on the contrary, and then to select the candidate drives in the processing of the flowcharts shown in FIGS. 7 and 8.

The processing explained so far represents the case where the RAID group is generated afresh but the automatic selection of candidates of omission drives may be executed so as to render the path kinds of the empty drives substantially uniform when the drives used are omitted.

Figure 11:
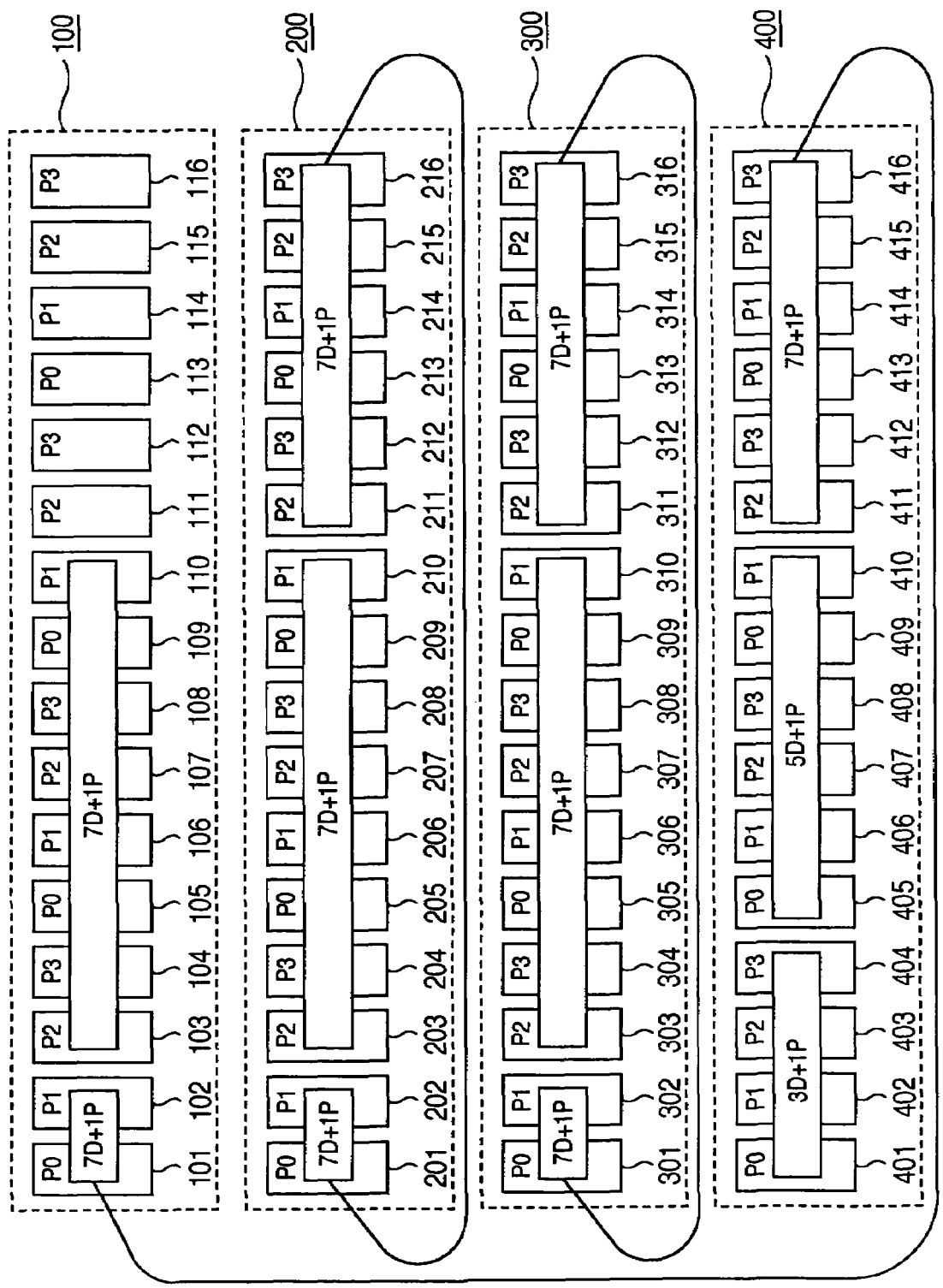
FIG. 11 is an explanatory view showing an example of a group generation state according to an embodiment of the invention.

As shown in the flowchart of FIG. 11, for example, the control portion inside the management terminal device 20 judges whether or not the operation at that time is omission of a drive from an existing group (Step S51) and when the judgment result proves the omission of a drive, the drives under use are displayed on the screen (Step S52). Here, whether or not any one drive is selected from the drives under use is judged (Step S53), and the selection of that drive is awaited. When any one of the drives is selected, the drives under use other than the selected drive are displayed on the screen (Step S54). At this time, a candidate drive to be omitted next is selected and is displayed by color classification to distinguish it from other drives. When this candidate drive is selected, the path kind of the present empty drives inclusive of the drive omitted in Step S53 is judged so that the path kinds of the empty drives can be distributed most uniformly.

The selection state of the candidate drive explained so far with reference to the flowchart will be explained next on the basis of an example of practical group setting. FIGS. 11 to 19 that will be hereinafter explained show the use condition of the drives. The graphic view of the drive shown in FIG. 5 by use of the management terminal device 20 may be made in the same way as the example shown in FIGS. 11 to 19. In this case, though the path kinds, the expansion modules and the RAID groups are distinguished by reference numerals in the drawings, they may be distinguished by changing the display form such as the color classification when the display is made in practice.

As shown in FIG. 11, this example includes four expansion modules 100 to 400 each having sixteen drives 101 to 116, 201 to 216, 301 to 316 and 401 to 416. The path systems connected to the drives inside each expansion module are uniformly distributed to the first path P1, the second path P2, the third path P3 and the fourth path P4 in accordance with the order of the arrangement of the drives as already shown in FIG. 4. Referring to FIG. 11, symbols P0, P1, P2 and P3 represents the kinds (systems) of the paths connected inside each drive.

A thick line encompassing each drive in the bridge form represents the setting state of the group. The case of (7D+1P) in the setting state of this group, for example, represents the group constituted by eight drives. Data blocks are distributed and stored in seven drives (7D) among them and the parity generated from the data block is stored in the remaining one drive (1P).

The example shown in FIG. 11 comprises six (7D+1P) groups each including 8 drives, one (5D+1P) group including 6 drives and one (3D+1P) group including 4 drives, and 6 drives 111 to 116 of the expansion module 100 are the empty drives (that is, the drives not storing data) that are not grouped. Incidentally, in the group formation state shown in FIG. 11, the group is formed by using as much as possible the drives inside the same expansion module and the group constituted by the drives 101 and 102 of the expansion module 100 and the drives 411 to 416 of the expansion module 400 is only the group that bridges a plurality of expansion modules.

Figure 12:
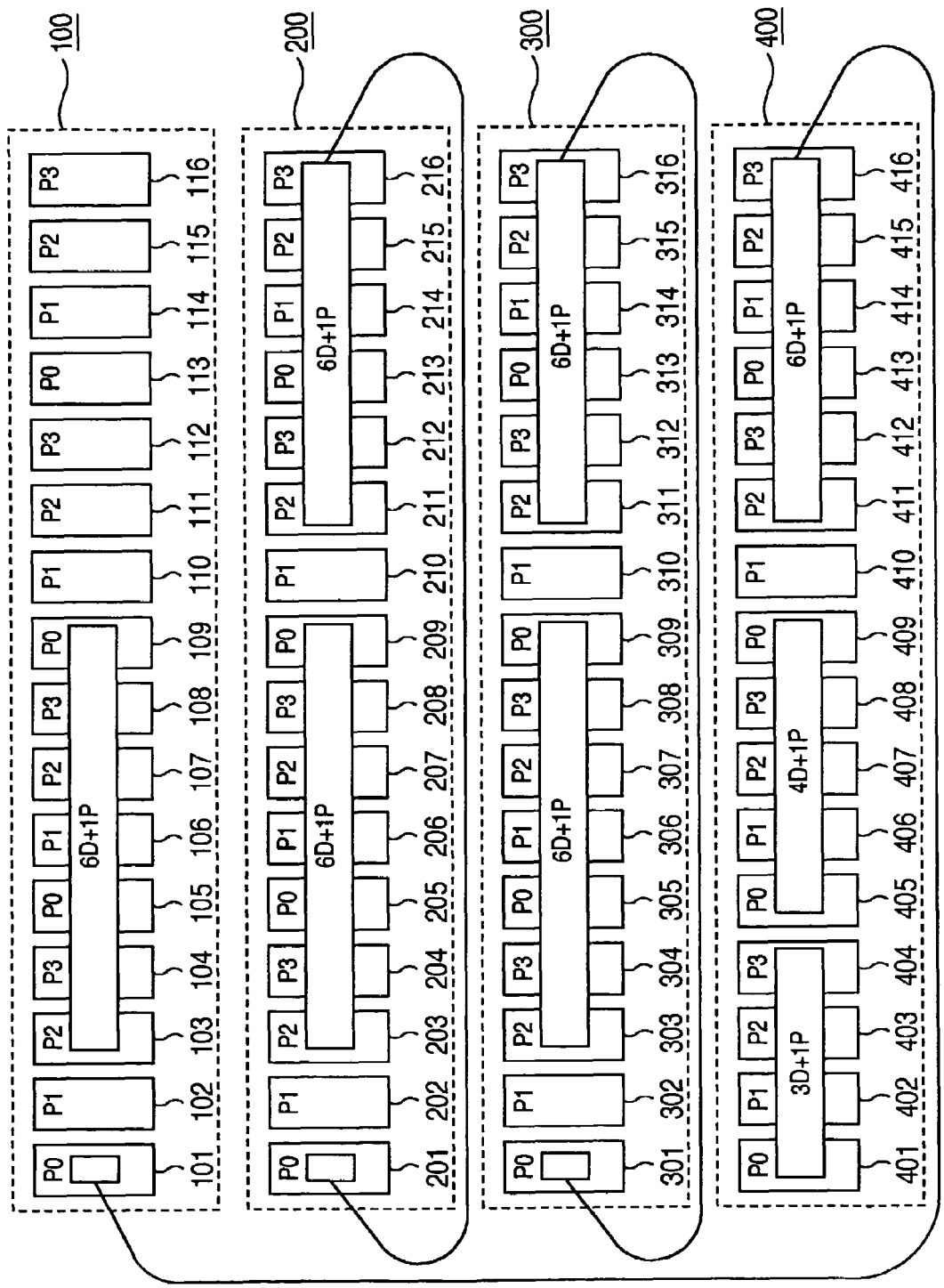
FIG. 12 is an explanatory view showing an example of a group generation state according to an embodiment of the invention.

It will be assumed hereby that a request for changing the group construction arises under this state and the group construction shown in FIG. 12 is changed, for example. In this case, one drive is omitted from each of six (7D+1P) groups to form six (6D+1P) groups and one drive is omitted from one (5D+1P) group to give one (4D+1P) group. The drives 102, 110, 202, 210, 302, 310 and 410 become afresh empty drives. When the group construction is changed from FIG. 11 to FIG. 12, the drive at the end of each group is simply omitted and the empty drive selection processing shown in the flowchart of FIG. 10 that takes re-use of the empty drives into account is not executed.

Figure 13:
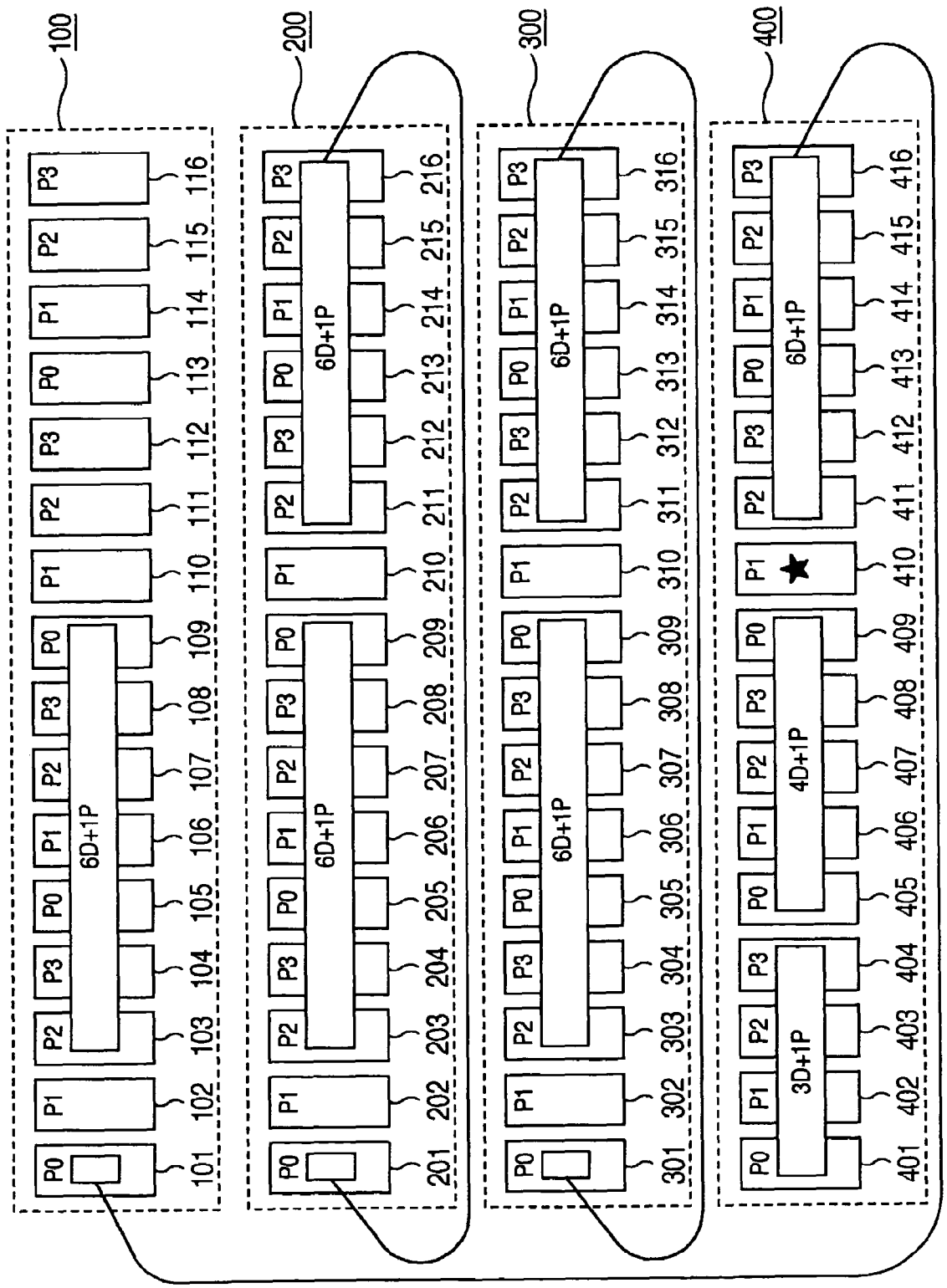
FIG. 13 is an explanatory view showing an example of a group generation state according to an embodiment of the invention.

It will be assumed that one (5D+1P) group comprising six drives is to be afresh generated in the group construction shown in FIG. 12. In the state shown in FIG. 12, a large number of empty drives connected to the path P1 exist, for example. Therefore, when six drives are merely selected from the empty drives, a possibility is high that a large number of drives connected to the path P1 are selected and in the worst case, six drives are all those connected to the path P1. When such a state occurs, accesses of the path P1 become concentrated when the accesses are made to the RAID group generated afresh. In contrast, when the expansion processing is executed in accordance with the flowchart shown in FIG. 7, for example, the operator first selects one drive from the empty drives shown in FIG. 12. It will be assumed that a drive 410 indicated by asterisk is selected as shown in FIG. 13. The path kind connected to this drive 410 is the path P1 and the drives automatically selected next as candidates on the side of the management terminal 200 are those drives that are connected to the paths other than the path P1. Therefore, in the example shown in FIG. 13, any of the drives 111, 112, 113, 115 and 116 are the next candidates. When four drives are selected, one drive of each of the paths P0, P1, P2 and P3 is selected.

Figure 14:
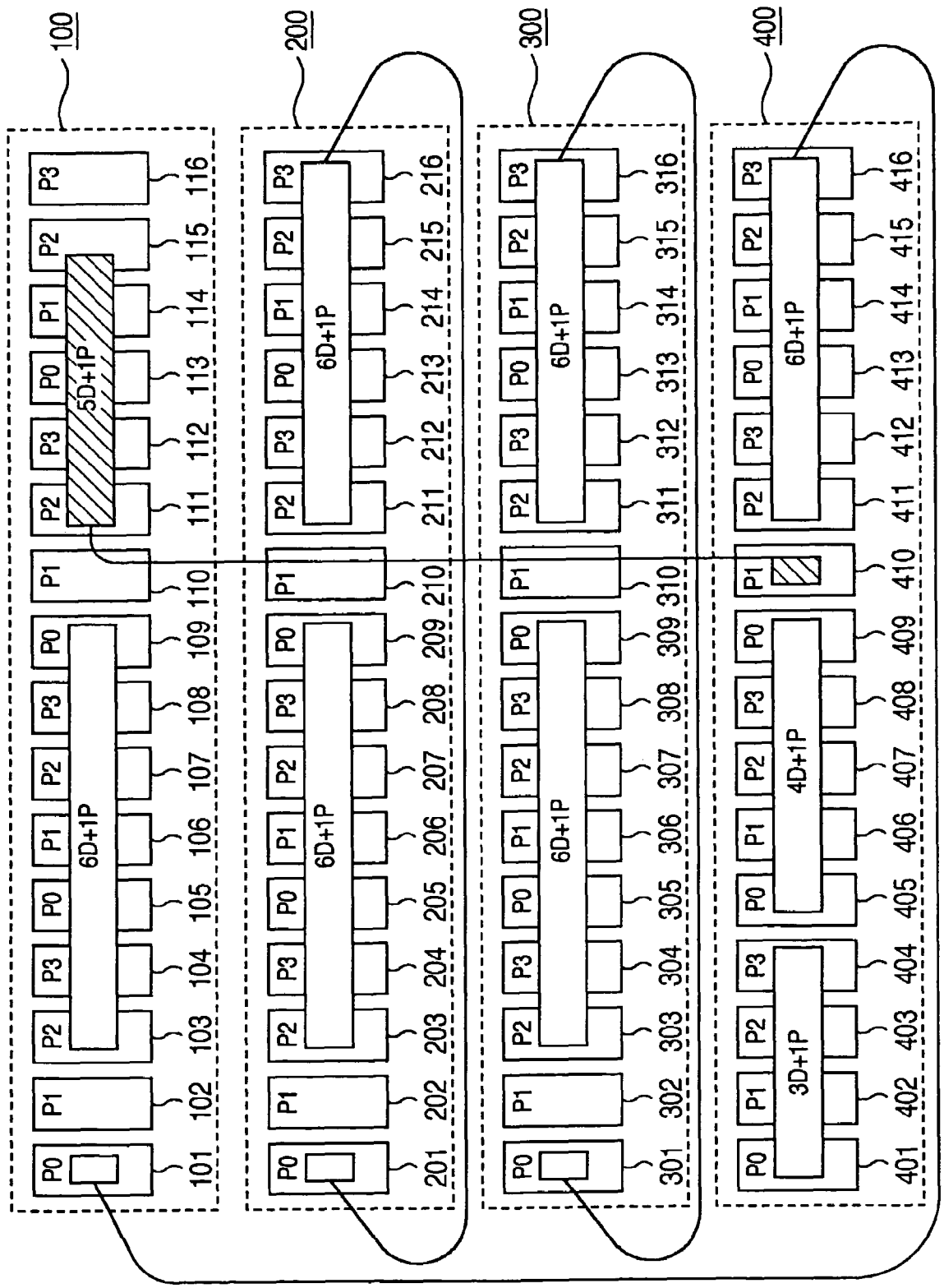
FIG. 14 is an explanatory view showing an example of a group generation state according to an embodiment of the invention.
Figure 15:
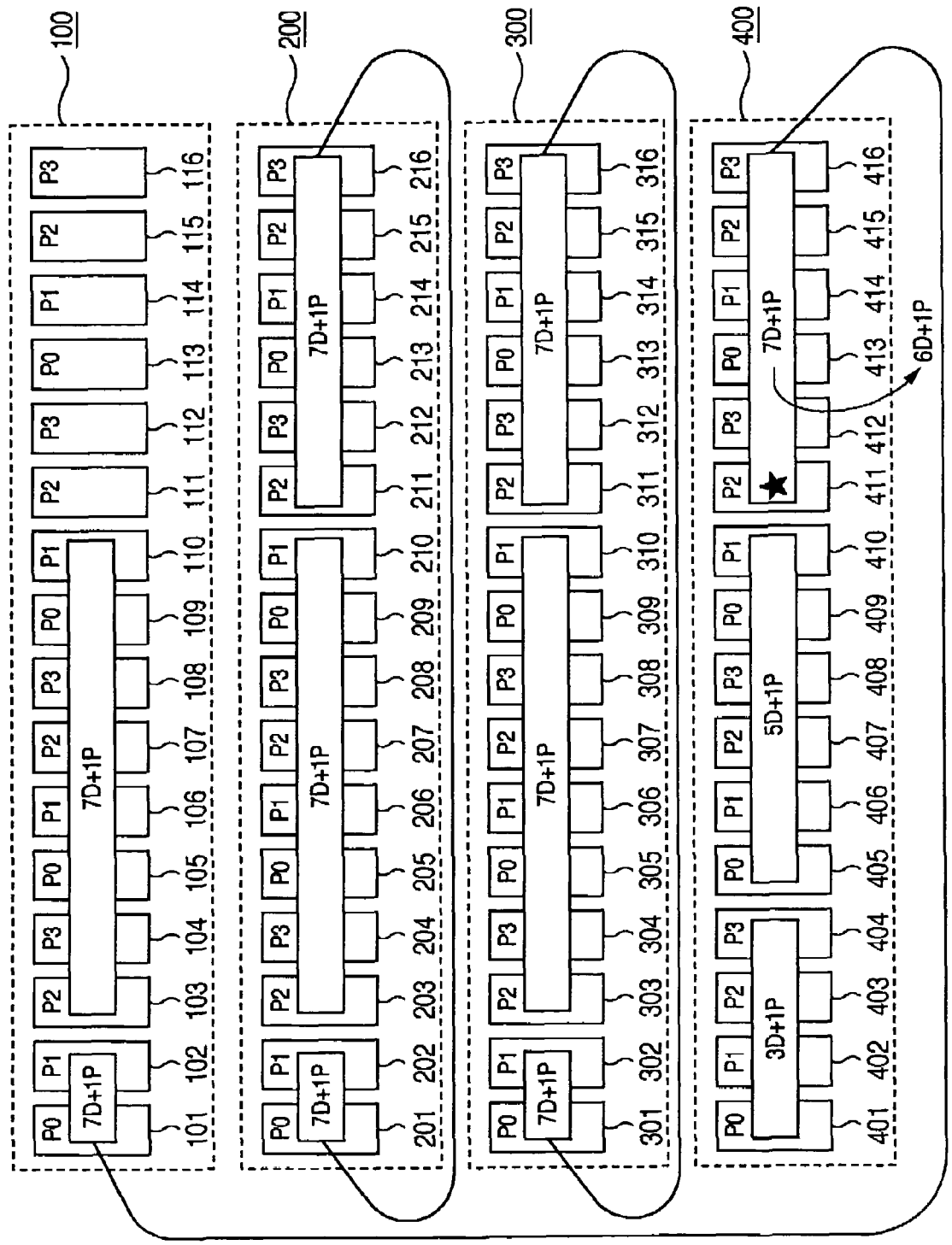
FIG. 15 is an explanatory view showing an example of a group generation state according to an embodiment of the invention.
Figure 16:
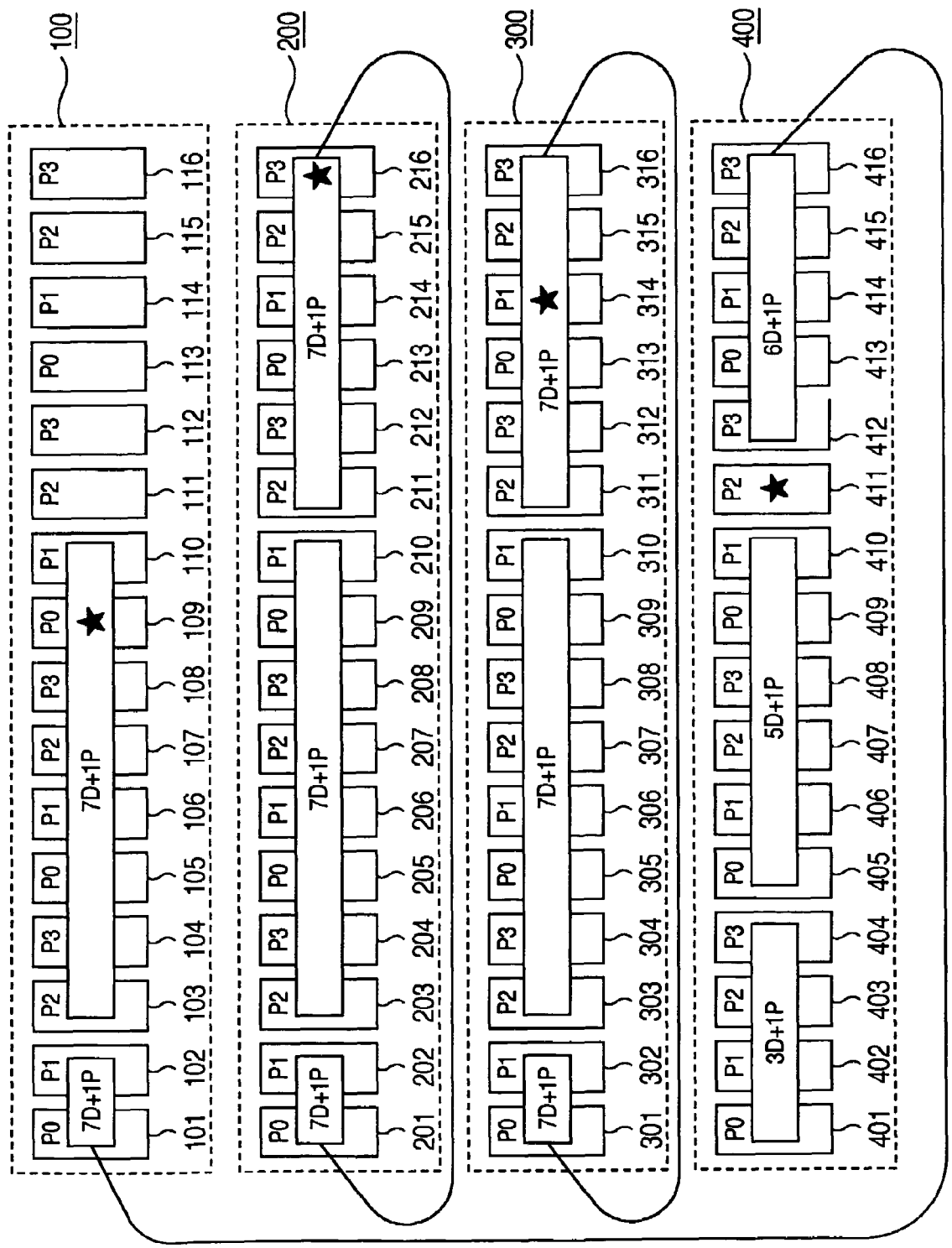
FIG. 16 is an explanatory view showing an example of a group generation state according to an embodiment of the invention.
Figure 17:
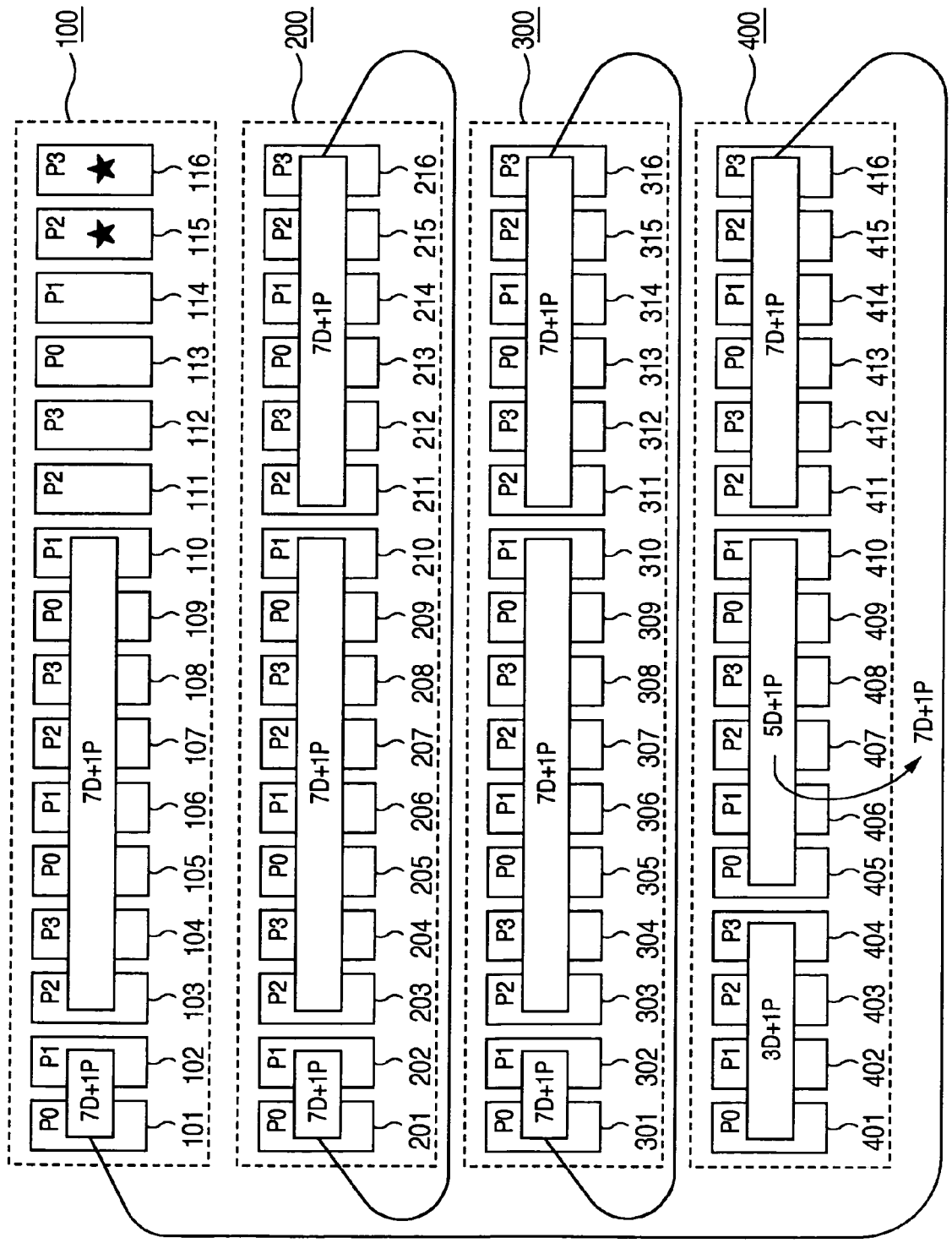
FIG. 17 is an explanatory view showing an example of a group generation state according to an embodiment of the invention.

When the six drives are selected on the basis of the candidates automatically selected in this way, six drives including the drives 111 to 115 and the drive 410 having a substantially uniform use condition of paths are selected, and these six drives form afresh a group as shown in FIG. 14.

When the processing for initially setting the group construction is executed as shown by the flowchart in FIG. 8, one drive 410 is selected as shown in FIG. 13 and immediately thereafter the group including the six drives 111 to 115 and 410 is automatically selected as shown in FIG. 14.

Next, an example where the empty drive selection processing is executed in consideration of re-use of the empty drives shown in the flowchart in FIG. 8 will be explained. Turning back to the group construction shown in FIG. 11, it will be assumed that a request for changing the four (7D+1P) groups to (6D+1P) groups by respectively omitting one drive in the group construction shown in FIG. 11 arises. It will be assumed further that the drive 411 (connected to the second path P2) in the group constituted by the drives 101, 102 and 411 to 416 is selected at this time as the drive to be omitted and this group is changed to the (6D+1P) group.

Under this state, the processing is executed so that the path kind of the drives omitted becomes substantially uniform. Therefore, the drives displayed as candidates of the drives to be subsequently omitted are those connected to the paths other than the path P2 as indicated by the asterisk in FIG. 16, for example, and the path kinds of the empty drives become substantially uniform. Because the path kinds of the empty drives become substantially uniform in this way, the group having the path kinds that are uniformly distributed can be easily formed when the group is formed again by using the empty drives.

Next, let's consider again the group construction shown in FIG. 11. It will be assumed that a request for changing the (5D+1P) group including the drives 405 to 410 to a (7D+1P) group by increasing two drives arises in the group construction shown in FIG. 11. The use condition of the path kinds of the existing drives 405 to 410 in this case includes two drives connected to the path P0, two drives connected to the path P1 and one each connected to the paths P2 and P3. At this time, the drives 115 and 116 connected to the paths P2 and P3 are selected automatically as candidates from among the empty drives so that the path kinds in the group become substantially uniform and the group of (7D+1P) is constituted by total eight drives having the uniformly distributed path use condition.

Figure 18:
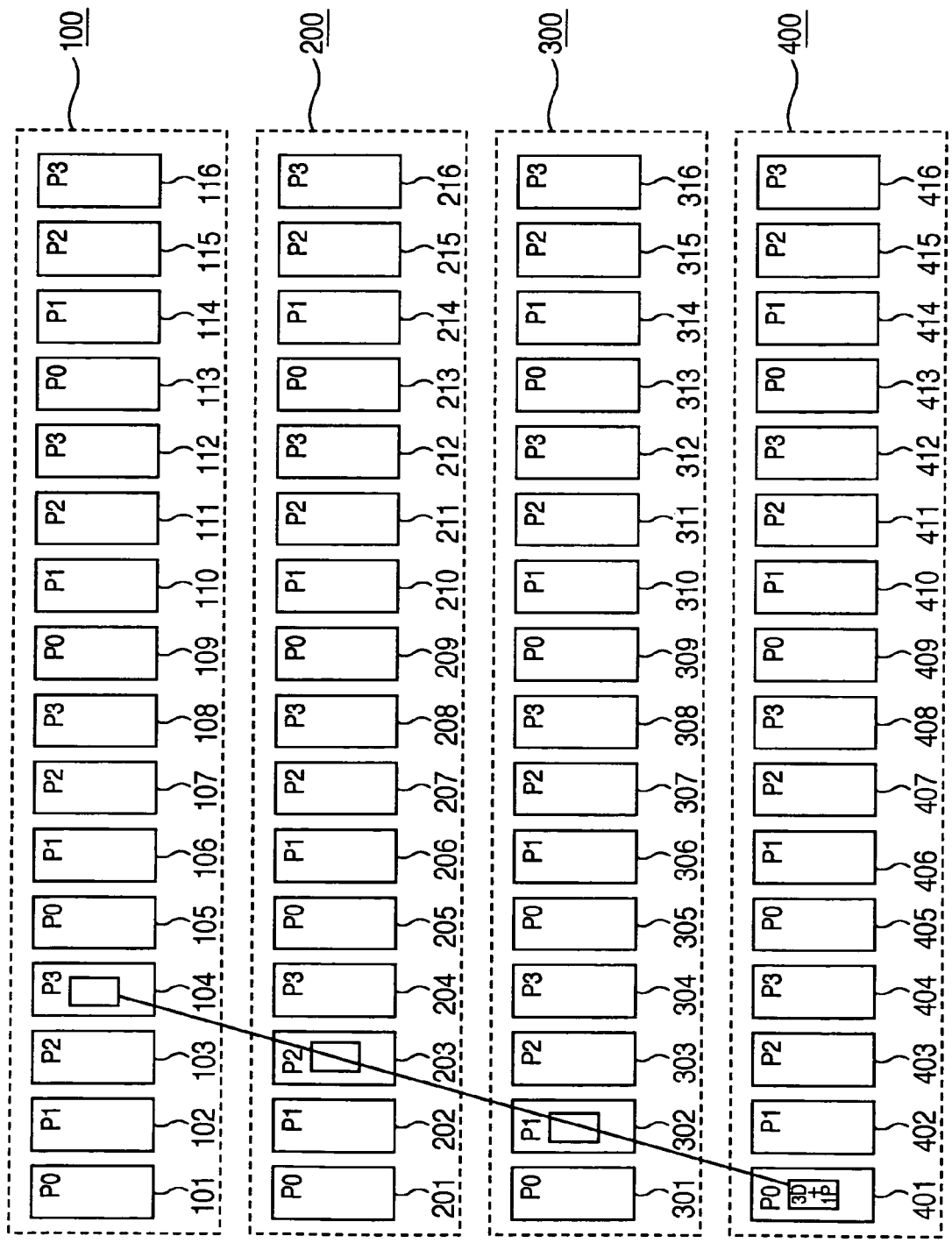
FIG. 18 is an explanatory view showing an example of a group generation state according to another embodiment of the invention.

When the processing for distributing the modules of the drives for forming the group is executed as explained with reference to the flowchart of FIG. 9, four drives 104, 203, 302 and 401 are selected from all different modules to constitute a (3D+1P) group constituted by the four drives as shown in FIG. 18, for example. According to this construction, since the drives can be distributedly arranged in a plurality of expansion modules, the data can be protected even when all the drives inside a specific expansion module stop.

Figure 19:
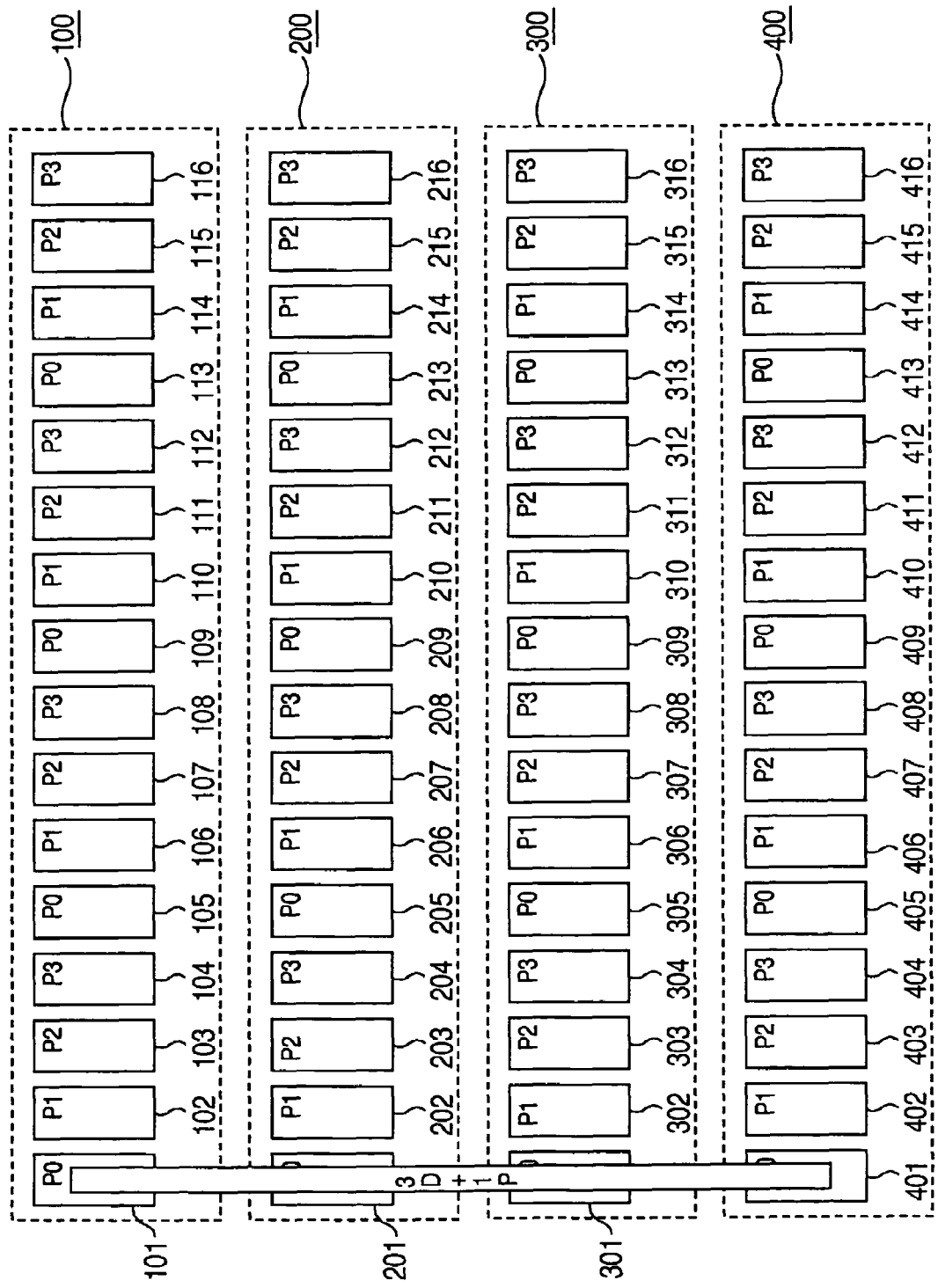
FIG. 19 is an explanatory view showing an example of a group generation state according to still another embodiment of the invention.

The explanation given above represents the example where the drives connected to different path kinds are distributedly arranged in one expansion module but the invention can be likewise applied to the construction in which only the drives connected to one kind of the path are arranged in one expansion module, too. As shown in FIG. 19, for example, the drives 101 to 116 in the expansion module 100 are all connected to the path P0, the drives 201 to 216 in the expansion module 200 are all connected to the path P1, the drives 301 to 316 in the expansion module 300 are all connected to the path P2 and the drives 401 to 416 in the expansion module 400 are all connected to the path P3.

According to the construction described above, the group comes to have the construction in which the drives always bridge a plurality of expansion modules as in the case of the (3D+1P) group shown in FIG. 19 by distributing the path kinds and forming the group as in this embodiment and the drives are distributedly used.

Incidentally, the display example when the number of the hard disk drives is increased or decreased may use other display examples. When the number of the hard disk drives is increased by changing the number of the hard disk drives forming a RAID level of the RAID group or a RAID group constituted by a predetermined number of hard disk drives, the disk array system is allowed to display the view for designating the RAID level after the change and the number of hard disk drives for forming the RAID level after the change, and to also display the hard disk drives as the object of the increase so that the number of the usable hard disk drives or the distribution state of the paths connected to the hard disk drives used in the designated RAID level attains maximum.

When the number of the hard disk drives is decreased by changing the number of the hard disk drives forming the RAID level of the RAID group constituted by a predetermined number of hard disk drives or the RAID group, the disk array system is allowed to display a view for designating the RAID level after the change and the number of hard disk drives forming the RAID level after the change and to also display the hard disk drive connected to the path having the smallest number of connections among a plurality of paths connected to the hard disk drives not used, as the hard disk drives as the object of decrease.

When the number of the hard disk drives is decreased by changing the RAID level of a RAID group constituted by a predetermined number of hard disk drives or the number of the drives constituting the RAID group, the disk array system is allowed to display a view for designating the RAID level after the change and the number of hard disk drives forming the RAID level after the change and to also display the hard disk drives as the object of decrease so that the number of kinds of the paths connected to the hard disk drives forming the RAID group becomes maximal.

In the embodiment explained so far, the explanation has been given on the processing that prepares four kinds (four systems) of paths as the paths for the drives as the storage devices and distributes these four kinds of paths but the number of the kinds of the paths is not particularly limited to the four kinds. It is also possible, for example, to prepare two kinds (two systems) of paths and to execute a processing so that the use conditions of the two kinds of the paths become substantially uniform among the groups. High access performance can be maintained by so doing because the use condition of the paths can be kept uniform.

In the embodiment explained above, each drive is directly connected to the loop constituted by the Fibre Channel. However, it is also possible to interpose an interface adaptor called "SATA" (Serial ATA) into the loop of the Fibre Channel and to connect a plurality of drives (storage devices) by the SATA interface.

The embodiment has been explained so far on the assumption that the function of executing the processing of the invention is in advance assembled in the management terminal fitted to the disk array system. However, it is also possible to produce a computer program for executing a group management processing of the storage devices of the invention, for example, and to install the program to the computer as the management terminal for managing the existing disk array system.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk array system connectable to a host, comprising:
a plurality of hard disk drives;
an input/output control portion for controlling data input/output between said host and said hard disk drives;
a plurality of paths for connecting said hard disk drives and said input/output control portion; and
modules each accommodating a predetermined number of said hard disk drives;
wherein, when a number of said hard disk drives is increased or decreased, said disk array system displays other hard disk drives or modules connected to paths different from a path connected to said hard disk drives to be increased or decreased.

2. The disk array system according to claim 1, wherein, when a group constituted by said predetermined number of hard disk drives is increased, other hard disk drives connected to paths different from the path connected to the increased hard disk drives among hard disk drives not used are displayed.

3. The disk array system according to claim 2, wherein said increased number of hard disk drives constituting said group are distributedly connected to two or more of the plurality of paths.

4. The disk array system according to claim 3, wherein said increased number of hard disk drives constituting said group are also distributed to two or more of the plurality of modules.

5. The disk array system according to claim 1, wherein, when the number of said hard disk drives is decreased in a group constituted by said predetermined number of hard disk drives, other hard disk drives connected to paths different from the path connected to the decreased hard disk drives are displayed.

6. The disk array system according to claim 5, wherein a plurality of hard disk drives not used are distributed to hard disk drives connected to two or more of the plurality of paths as displayed.

7. A disk array system connectable to a host, comprising:
a plurality of hard disk drives;
an input/output control portion for controlling data input/output between said host and said hard disk drives;
a plurality of paths for connecting said hard disk drives and said input/output control portion; and
modules each accommodating a predetermined number of said hard disk drives;
wherein, when a number of said hard disk drives is increased or decreased, said disk array system displays other hard disk drives accommodated in modules different from a module accommodating said hard disk drives to be increased or decreased.

8. The disk array system according to claim 7, wherein, when a group constituted by said predetermined number of hard disk drives is increased, among hard disk drives not used, other hard disk drives accommodated in modules different from a module accommodating a selected hard disk drive are displayed.

9. The disk array system according to claim 8, wherein said increased number of hard disk drives constituting said group are distributedly accommodated in two or more of the plurality of modules.

10. The disk array system according to claim 7, wherein, when a number of said hard disk drives is decreased in a group constituted by said predetermined number of hard disk drives, other hard disk drives accommodated in modules different from a module accommodating a selected hard disk drives are displayed.

11. The disk array system according to claim 10, wherein a plurality of hard disk drives not used are distributedly accommodated in two or more of the plurality of modules as displayed.

12. The disk array system according to claim 1, wherein, when the number of said hard disk drives is increased by changing an RAID level of an RAID group constituted by said predetermined number of hard disk drives or a number of hard disk drives forming said RAID group, said disk array system displays a view for designating an RAID level after the change and a number of hard disk drives forming the RAID level after the change, and displays said hard disk drives as an object of the increase so that a number of usable hard disk drives or distribution of paths connected to said hard disk drives to be used attains maximum.

13. The disk array system according to claim 1, wherein, when a number of said hard disk drives is decreased by changing an RAID level of an RAID group constituted by said predetermined number of hard disk drives or a number of hard disk drives forming said RAID group, said disk array system displays a view for designating an RAID level after the change and a number of hard disk drives forming the RAID group after the change, and displays said hard disk drives connected to a path having a smallest number of connections among a plurality of paths connected to hard disk drives not used as an object of the decrease.

14. The disk array system according to claim 1, wherein, when the number of said hard disk drives is decreased by changing an RAID level of an RAID group constituted by said predetermined number of hard disk drives or a number of hard disk drives forming said RAID group, said disk array system displays a view for designating an RAID level after the change and a number of hard disk drives forming an RAID group after the change, and displays hard disk drives as an object of the decrease so that kinds of paths connected to said hard disk drives forming said RAID group attain maximum.

15. A disk array system connectable to a host, comprising:
a plurality of hard disk drives;
an input/output control portion for controlling data input/output between said host and said hard disk drives;
a plurality of paths for connecting said hard disk drives and said input/output control portion; and
modules each accommodating a predetermined number of said hard disk drives;
wherein:
when a number of said hard disk drives is increased or decreased, said disk array system displays other hard disk drives accommodated in modules different from a module accommodating said hard disk drives to be increased or decreased, and
when a group constituted by said predetermined number of hard disk drives is increased, among hard disk drives not used, hard disk drives not used accommodated in modules different from a module accommodating a selected hard disk drives are displayed, or when the number of said hard disk drives is decreased in said group constituted by said predetermined number of hard disk drives, other hard disk drives accommodated in modules different from a module accommodating a selected hard disk drive are displayed.

* * * * *